United States Patent
Burchetta et al.

(10) Patent No.: US 6,330,551 B1
(45) Date of Patent: Dec. 11, 2001

(54) COMPUTERIZED DISPUTE RESOLUTION SYSTEM AND METHOD

(75) Inventors: James D. Burchetta, New York; Charles S. Brofman, Waccabuc, both of NY (US)

(73) Assignee: cybersettle.com, Inc., Mt. Kisco, NY (US)

( * ) Notice: Subject to any disclaimer, the term of this patent is extended or adjusted under 35 U.S.C. 154(b) by 0 days.

(21) Appl. No.: 09/130,154

(22) Filed: Aug. 6, 1998

(51) Int. Cl.[7] .................................................. G06F 17/60
(52) U.S. Cl. .................................. 705/80; 705/4; 705/37
(58) Field of Search ................................ 705/1, 4, 37, 80

(56) References Cited

U.S. PATENT DOCUMENTS

| | | | |
|---|---|---|---|
| 3,573,747 | | 4/1971 | Adams et al. ............... 340/172.5 |
| 3,581,072 | * | 5/1971 | Nymeyer ......................... 705/37 |
| 5,077,665 | * | 12/1991 | Silverman et al. ............... 705/37 |
| 5,329,589 | | 7/1994 | Fraser et al. .................... 379/91 |
| 5,495,412 | | 2/1996 | Thiessen ......................... 364/401 |
| 5,668,953 | | 9/1997 | Sloo .................................. 705/1 |
| 5,689,652 | * | 11/1997 | Lupien et al. .................... 705/37 |
| 5,794,207 | | 8/1998 | Walker et al. .................... 705/23 |
| 5,905,975 | * | 5/1999 | Ausubel ........................... 705/37 |
| 5,924,082 | * | 7/1999 | Silverman et al. ............... 705/37 |
| 5,956,687 | * | 9/1999 | Wamsley et al. .................. 705/1 |
| 5,983,205 | * | 11/1999 | Brams et al. ..................... 705/37 |
| 6,112,181 | * | 8/2000 | Shear et al. ...................... 705/1 |
| 6,112,189 | * | 8/2000 | Rickard et al. ................... 705/37 |
| 6,131,087 | * | 10/2000 | Luke et al. ....................... 705/26 |

FOREIGN PATENT DOCUMENTS

97/04410 * 2/1997 (WO).
WO 97/15362
    A1 * 5/1997 (WO).

OTHER PUBLICATIONS

Online Ombuds Office Web site, http://aaron.sbs.umass.edu/center/ombuds/default.htm and ?description.html, Apr. 14, 2000.*

Robbins, S.B., "Lowering the Cost of Doing Business through ADR," vol. 96, No. 11, pp. 58–59, Oct. 1997.*

Hill, R., "Will Cyberspace Use Cybercourts?," International Commerical Litigation, Issue 23, pp. 33–35, Oct. 1997.*

Mandell, J., "Cyberspace Conflicts?," Software Magazine, vol. 18, No. 4, p. 20, Mar. 1998.*

Negussie, M.M., "How to Select a Mediator," Defense Counsel Journal, vol. 65, No. 2, pp. 256–261, Apr. 1998.*

Macduff, I., "Flames on the Wires: Mediating from an Electronic Cottage," Negotiation Journal, vol. 10, No. 1, pp. 5–15, Jan. 1994.*

(List continued on next page.)

Primary Examiner—Vincent Millin
Assistant Examiner—Nicholas David Rosen
(74) Attorney, Agent, or Firm—Morgan & Finnegan LLP

(57) ABSTRACT

A computerized system for automated dispute resolution through an Intranet website via the Internet or other communications linkage for communicating and processing a series of demands to satisfy a claim made by or on behalf of a claimant or other person involved in a dispute with at least one other person, such as a defendant, his or her insurer, or other sponsor, and a series of offers to settle the claim through at least one central processing unit including operation system software for controlling the central processing unit is disclosed. Preferably the system also allows for the collection, processing and dissemination of settlement data generated from the settlement through the operation of the system for use by sponsors and claimants in establishing the settlement value of future cases. Also disclosed is a method for communicating and processing a series of demands and a series of offers through the system.

200 Claims, 4 Drawing Sheets

OTHER PUBLICATIONS

Grob, K., and Schechter, P.L. "Discovering Opportunities in Alternative Dispute Resolution: A Step–by–Step Guide for Getting Involved," Outlook, vol. 62, No. 4, page 18, Winter, 1995.*

Stephenson, M. R., "Rescuing ADR from its Advances, "Public Adminstration Review, vol. 55, No. 4, pp. 385–388, Jul./Aug. 1995.*

Internet Business News, "Online Courtroom Service Introduced for U.S. Disputes," Jul. 1, 1996.*

Jackson, W., "Mediation Proposed for Securities Disputes," Business First–Columbus, vol. 9, No. 31, p. 4., Apr. 5, 1993.*

Skrzycki, C., "The Regulators: An Electronic Negotiation — Modern Times: OSHA to Try Writing Rules in Cyberspace," The Washington Post, Feb. 8, 1994, page D1.*

Helie, J., "Conflict and Conflict Resolution on Electronic Networks," Jun. 1994.*

SchWeber, C., "The Use of Technology in Conflict Resolution," paper presented at the European Conference on Peacemaking and Conflict Resolution, Oct. 1994, San Sebastian, Spain Oct. 1994.*

Brams, S. J., and Merrill, S., "Arbitration Procedures with the Possibility of Compromise," Control and Cybernetics, vol. 21, No. 1, page 131149 1992.*

Thiessen, E.M., and Loucks, D.P., "Computer Assisted Negotiation of Multiobjective Water Resources Conflicts," Water Resources Bullentin, vol. 28, No. 1, pp. 163–177, Jan./Feb. 1992.*

Mullins, R., "Mediation Arbitration Venues Offer Corporate Litigants Justice–in–Time," Business Journal–Milwaukee, vol. 9, No. 39, p. S6, Jul. 4, 1992.*

Yeened, N. N. "Electronics Alternative Dispute Resolution System Design," Mediation Quarterly, vol. 11, No. 2, pp. 193–194. Winter 1993.*

Abstract of New York Times editorial, Tuesday, Jan. 8, 1985.*

Hines, B. L., "Arbitration Spells Relief," Best's Review, vol. 86, p. 47 Jan. 1986.*

SchWeber, C., "Your Telephone May Be a Party Line: Mediation by Telephone," Mediation Quarterly, vol. 7, No. 2, pp. 191–195, Winter 1989.*

Denenberg, T.S., "The Electronic Arbitration," Journal, vol. 45, No. 1, pp. 48–52, Mar. 1990.*

Levin, National Underwriter, "Online Claim Settlement Services Hit The Net.", Nov. 9, 1999.*

Brams and Taylor, "Fair Division: From Cake–cutting to Dispute Resolution," published by Clark Boardman Callaghan, 1996.*

Arnold et al., "Patent Alternative Dispute Resolution Handbook," 1991.*

Shaw et al., "using Alternative Dispute Resolution in teh Federal Government," 1993.*

* cited by examiner

COMPUTERIZED DISPUTE RESOLUTION SYSTEM AND METHOD

FIELD OF THE INVENTION

This invention relates generally to computerized systems and more particularly to a computerized system for automated dispute resolution through a communications linkage for communicating and processing a series of demands to satisfy a claim made by or on behalf of a claimant or other person involved in a dispute with at least one other person, such as a defendant, his or her insurer, or other sponsor, and a series of offers to settle the claim by the other person. The invention also relates to a system for the collection, processing, and dissemination of settlement data generated from the settlement through the operation of the dispute resolution system for use by sponsors and claimants in establishing the settlement value of future cases.

BACKGROUND OF INVENTION

At the present time, it is readily apparent that a better way to resolve disputes has long been needed. Courtroom trials, once thought to be the only way to resolve legal controversies, are very costly and the outcome can be unsatisfactory for all concerned parties. The resulting disappointment with traditional litigation drove the creation of the alternative dispute resolution ("ADR") industry. However, conventional ADR, although sometimes helpful, is still costly and the results are often unacceptable.

An untold number of pending claims are ripe for settlement, but have not been resolved for reasons that have nothing to do with their merits. The present invention is based on the premise that the parties are best suited to settle those disputes but need a system that creates the opportunity for parties to successfully settle their claims easily, effectively, and inexpensively.

SUMMARY OF THE INVENTION

The present invention is a computerized system for automated dispute resolution through an Intranet website via the Internet or other communications linkage for communicating and processing a series of demands to satisfy a claim made by or on behalf of a person involved in a dispute, such as a plaintiff in a lawsuit or other claimant, with at least one other person, such as a defendant, his or her insurer, or other sponsor, and a series of offers to settle the claim through at least one central processing unit including operating system software for controlling the central processing unit.

The invention also provides a system for the collection, processing, and dissemination of settlement data generated from the settlement through the operation of the dispute resolution system for use by sponsors and claimants in establishing the settlement value of future cases.

The system has means for introducing information into the central processing unit corresponding to the identification of the dispute and the persons involved in the dispute, memory means for storing the information corresponding to the identification of the dispute and the persons involved in the dispute, means for introducing by or on behalf of a first person involved in the dispute against whom a claim is made information into the central processing unit corresponding to a series of rounds of offers to settle a claim without disclosure of the offers to other persons involved in the dispute, and means for introducing by or on behalf of a second person involved in the dispute information into the central processing unit corresponding to series of rounds of demands to satisfy the claim without disclosure of the demands to other persons involved in the dispute.

Preferably, the central processing unit receives information corresponding to three settlement offers and a plaintiff or claimant enters three demands in a plurality of communications with the system over a period of time, for example, 30 days. Time keeping means records the entry of the demands or offers over the selected time period. Comparison means included in the system compares the information corresponding to the series of demands and the series of offers on a round-by-round basis in accordance with preestablished conditions. The system also includes means for permanently deleting the demand and the offer in each round that does not result in a settlement based upon those preestablished conditions upon comparison of the demand and the offer in that round, and means for communicating to the first and second persons or representatives thereof the results of the comparison.

The preestablished conditions under which the comparison is made include the following:

If the offer in any round is less than the demand and within a preestablished percentage, for example thirty percent, of the demand in the same round, i.e. the offer is greater than or equal to seventy percent of the demand, the claim is settled for an amount in accordance with a first preestablished formula, for example, the median amount between the demand and the offer.

If the offer in any round is the same as or greater than the demand, the claim is settled for the demand amount.

If the offer is not within the preestablished percentage of the demand in all rounds, for example if seventy percent of the demand is greater than the offer, the claim is not settled unless the difference between the offer and demand is less than a preestablished amount, for example $5,000, in which case the claim is settled for an amount in accordance with a second preestablished formula, for example at the median amount between the demand and the offer. Thus, first and second preestablished formulas may be the same as or different from each other depending on the agreement of the parties.

The system preferably is designed to allow a user to communicate with the system through a standard PC computer and modem via the Internet. The system may also include a voice message system or means for generating voice messages to a person communicating with the system through a touch-tone or cell phone linkage to guide the person in the use of the system. Security means is preferably included to make the system accessible only upon entry of a case identification number identifying the dispute, a security code corresponding to the dispute, and a user security code corresponding to the dispute and identifying the user, i.e. the person or representative thereof who is making the demand or offer, for example the attorney for the person on whose behalf the demand or offer is made.

The method of the present invention communicates and processes a series of demands to satisfy a claim made by or on behalf of a person involved in a dispute with at least one other person and a series of offers to settle the claim through a computerized system for automated dispute resolution. having at least one central processing unit including operating system software for controlling the central processing unit, means for introducing information into the central processing unit corresponding to the identification of the dispute and the persons involved in the dispute, and memory means for storing the information corresponding to the identification of the dispute and the persons involved in the dispute.

The method comprises:

(a) introducing into the central processing unit information corresponding to a series of rounds of demands to satisfy the claim from a party representing a claimant involved in the dispute without disclosure of the demands to other persons involved in the dispute;

(b) introducing into the central processing unit information corresponding to a series of rounds of offers to settle the claim from a party representing a person involved in the dispute against whom the claim is made without disclosure of the offers to other persons involved in the dispute;

(c) steps (a) and (b) occurring in any order;

(d) comparing the information corresponding to the series of demands and the series of offers on a round-by-round basis in accordance with preestablished conditions;

(e) permanently deleting the demand and the offer in each round that does not result in a settlement upon comparison of the demand and the offer in that round based on those preestablished conditions; and (f) communicating to the claimant and the person against whom the claim is made or representatives thereof the results of the comparison.

BRIEF DESCRIPTION OF THE DRAWINGS

The following detailed description may best be understood by reference to the following description in conjunction with the accompanying drawings in which.

DETAILED DESCRIPTION OF THE INVENTION

The present invention is a computerized system for automated dispute resolution through an Intranet website via the Internet or other communications linkage 1 for communicating and processing a series of demands to satisfy a claim made by or on behalf of a person involved in a dispute with at least one other person and a series of offers to settle the claim.

A demand is the amount of money required by the person having a claim 2, 3 against another person 4, 5, 6, 7, such as a defendant or his or her insurer, for which the person with the claim would be willing to settle. Information corresponding to the amount of the demand will be entered by the claimant or his or her representative by using the numbers of a touch-tone or cellular telephone or by typing the numbers on the keyboard of a personal computer. An offer is the amount of money the defendant or the insurance company will settle the claim.

The system communicates and processes the demands to satisfy and the offers to settle the claim through at least one central processing unit and includes operating system software for controlling the central processing unit 8, means for introducing information into the central processing unit 8 corresponding to the identification of the dispute and the persons involved in the dispute, and memory means 9 for storing the identification of the dispute and the persons involved in the dispute.

Preferably, the computer is secure, for example by the implementation of a "firewall" or protective barrier against unauthorized traffic or the use of encryption technology, and each case is preferably triple-password protected to assure privacy and prevent unauthorized access. For example, the system may require the user to enter a password or user identification number or alphanumeric combination and a user authorization code providing access control to the system. For increased security, systems may be designed which require user authentication, for example through the use of voice pattern, fingerprints, physical signature, or "smart" card.

Figure 1:
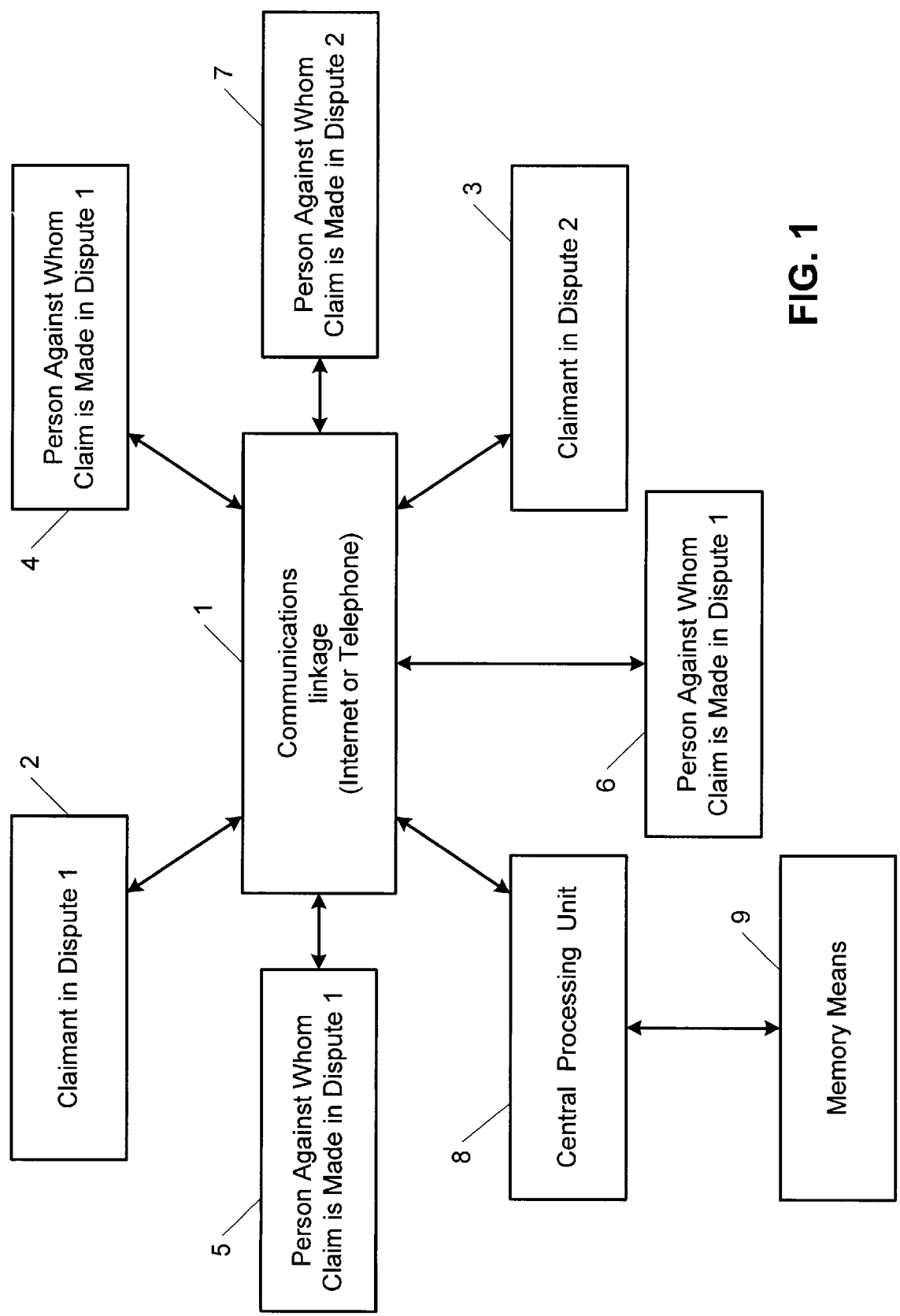
FIG. 1 is an overview of the computerized system of the present invention.

No strategies, evaluations, or other work product are directly or indirectly disclosed to anyone, including the adverse party. Settlement offers and claimants demands that do not result in a settlement are never revealed to anyone. FIG. 1 shows the system of this invention using the Internet or a telephone as the communications linkage.

A person involved in a dispute is anyone or any company who has a claim against another person or against whom another person has asserted a claim, whether litigation is pending or not. The system includes:

means for introducing by or on behalf of a first person involved in the dispute against whom a claim is made information into the central processing unit corresponding to a series of rounds of offers to settle a claim without disclosure of the offers to other persons involved in the dispute, means for introducing by or on behalf of a second person involved in the dispute information into the central processing unit corresponding to a series of rounds of demands to satisfy the claim without disclosure of the demands to other persons involved in the dispute, comparison means for comparing the information corresponding to the series of demands and the series of offers on a round-by-round basis in accordance with preestablished conditions, means for permanently deleting the demand and the offer in each round that does not result in a settlement upon comparison of the demand and the offer in that round based upon those preestablished conditions, and means for communicating to the first and second persons or their representatives the results of the comparison.

Preferably, there will be three offers for each claim. Each demand will be compared with the offer of the same number (i.e. Demand #1 to Offer #1, Demand #2 to Offer #2, etc.). The computer matches the settlement offer against the claimant's demand and performs its programmed calculations in order to determine whether or not a settlement has been achieved. Where the demand and offer intersect in accordance with preestablished conditions, settlement is reached. In the case that the demand is less than or equal to the offer, then the case is settled at a settlement amount equal to the demand. In the case that the demand exceeds the offer, the system will preferably split the difference if the offer is within a preestablished percentage, for example 70% of the demand (i.e. demand×0.70<=offer). In such case, the settlement amount is the demand plus the offer divided by two. If 70% of the demand is still greater than the offer, there is no settlement unless the difference between the demand and offer is less than a preestablished amount, for example $5,000, in which case the claim is settled for the median amount between the demand and the offer.

Figure 2:
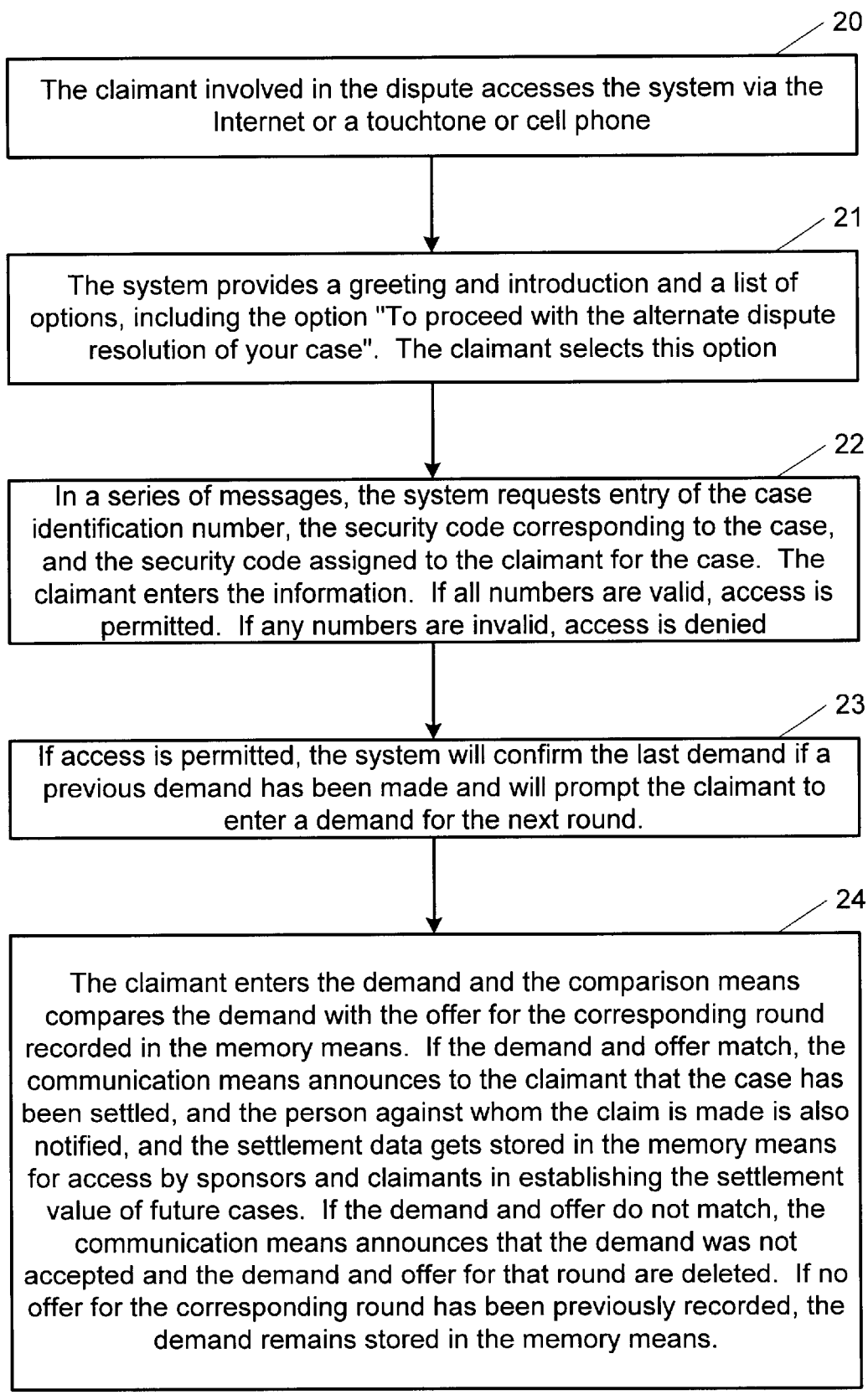
FIG. 2 is a block diagram showing how a claimant involved in a dispute interacts with the computerized system of this invention.

Thus, the parties communicate only with the computer, avoiding direct communication with each other. Wasteful personality conflicts fruitless and unnecessary disagreements, posturing and positioning cannot occur, so the parties deal exclusively with the "bottom line". FIG. 2 shows how a claimant involved in a dispute would use the confidential and automated system of this invention without direct communication with the other side.

The system preferably also comprises security means whereby the system is accessible only upon entry of a case identification number identifying the dispute, and a user security code corresponding to the dispute and identifying the person or representative thereof who is making the demand or offer.

Preferably, the system comprises means for generating voice messages to a person communicating with the system through a touch tone or a cellular phone linkage which guides the person in the use of the system. Alternatively, written messages may be used as prompts when the system is accessed from a personal computer via the Internet.

The entry of claims and settlement offers may also be expedited by a trained staff of computer professionals. For example, the website or telephone linkage can provide a series of options, one of which places the user into on-line or telephone communication with a customer service representative to answer questions or provide other assistance. Thereafter, the user may access the system by communicating to the processing unit via the Internet or by telephone, e.g. a toll-free number, at any time or day of the week to enter claims or settlement offers. Preferably, the system comprises time keeping means to record the introduction of the information corresponding to the demands or offers over a period of time. In this way, introduction of information corresponding to demands or offers may be made in a plurality of communications with the system over a period of time. The system can handle multiple telephone calls or other communications from anywhere in the world.

The computer performs its functions and the result are reported to the parties as they occur in real time without waiting.

The system also encourages and enables plaintiffs to take a realistic approach to settlement with no risk of appearing irresolute or hesitant since a claimant's financial demands that do not result in a settlement are never disclosed. Preferably, claimants have only three or some other previously agreed-upon number of opportunities or rounds to settle claims using the system, and preferably settlement offers or rounds have only a limited period or "shelf life" in which they are operable, for example thirty days for all rounds, which encourages prompt action by claimants.

The system preferably also collects and processes settlement data generated from a settlement reached through the operation of the system for dissemination and use by users, for example sponsors and claimants, in establishing the settlement value of future cases. Means may be provided for a user to access actual settlements achieved through the use of the system in other disputes, for example, through a menu or voice choice provided to the user via telephone or the Internet whose selection provides the user with information about prior settlements. The data may be tabulated in the memory means so as to be accessible by certain categories, for example by court, by sponsor, by geographic location, or by other category. In this way, a user of the system can be guided in making demands and offers by actual settlements reached in similar cases.

The invention can be understood readily from the following description of a preferred embodiment in conjunction with the overview of FIG. 1. The present invention provides an online system, preferably Intranet website via the Internet or telephone accessible or both, to facilitate the settlement of claims by allowing attorneys and claims adjusters to use a simple interface to rapidly post a series of monetary claims against a case being tested against an algorithm for possible settlement. Preferably, the system also calculates, stores and tabulates settlement data once a settlement has been reached for reference by other users.

A person involved in a dispute against whom a claim has been made, such as a defendant or an insurer or other sponsor, preferably submits claims to the computerized system using electronic media and formats agreed upon by the parties. The sponsors preferably can also describe the algorithm amount and percentage to calculate claims and at the individual claim level check their exposure for a series of claims with a built-in calculator provided by a computer program in the system. Attorneys for a claimant can make demands in return and calculate their potential settlement gain. Claimant attorneys may be invited to participate in the process by an automatically generated letter that is sent out once the sponsor enters the case. The attorneys may then log into the system by special authorization codes.

The parties involved may agree in advance to the algorithm amount and the percentage, or a first person involved in a dispute may enter this data which is then agreed to by the second person.

In an Internet-based embodiment of the present invention, an Internet website is set up to provide the interface between system and user. Preferably, the major areas of the website include a login area for sponsors or their representatives, a login area for claimants or attorneys for claimants, and a login area for administration personnel who oversee the system. If desired, the website may also include a publicly accessible area that highlights information about the system. For increased security, a separate website may be set up with this information.

Individuals using the computerized system preferably must log into the system before they can manipulate any data. Preferably, they can view, enter and change only that information that is within their access limits—as an attorney for claimant, a sponsor user, a sponsor administrator, or a system administrator. A sponsor user is a claims adjuster or other agent who works for a sponsor, for example an insurance company or large self-insured organization, which has entered into an agreement to use the computerized system. A sponsor user is preferably limited to entering and reviewing cases relevant to their own entered cases, not cases entered by other sponsor users of the same sponsor.

Thus, a sponsor user preferably may enter the website to login to the system, for example by using a user name and password combination or pair, read and agree to an agreement for the sponsor's participation in the system, assign new cases for claimant attorney participation, and review any completed, pending or in-process cases that have been entered into the system by that sponsor user.

A sponsor administrator is a sponsor user who has been granted administrator privileges by the sponsor. Preferably, in addition to performing all the tasks that a regular sponsor user may perform, a sponsor administrator may enter the website to change sponsor contact information, change sponsor user login and contact information, add or delete sponsor users, create sponsor users with administrator privileges, and review cases for all sponsor users within the sponsor.

Claimants or their attorneys may enter the website to login to the system preferably using a username and password pair, read and agree to a system participation agreement for the claimant, review case information as prepared by the sponsor, with current case status information, and post claims against a particular case.

Preferably, system administrators who work for a company administering the system assist in the implementation of the system. System administrators with proper authorization, for example username/password combination identifying them as such, may enter the website to review, modify, delete and create sponsors, sponsor users, and sponsor administrators, and review, modify and delete and create cases or claims to be processed by the system. Preferably, a case report writer may be provided containing current case status information searchable by date, sponsor, sponsor user, case name and status, which is able to be accessed or queried by the system administrator. A more limited form of case report writer may also be provided to claimants and other users of the system in which only information that is within the user's access limit may be searched.

The system of the present invention is preferably designed to make it easy for a claimant attorney with any common Internet or telephone access to settle legal disputes that involve a monetary settlement.

In using the system, the sponsor accesses the system, for example, with a login to the website. The sponsor may at that time enter any pertinent case information about the case and the claimant attorney. After adding or reviewing case details, the sponsor submits all at once or over time a number of settlement offers, preferably up to three, for each claim submitted. Each settlement offer is identified by Round. For example, a sponsor may enter $40,000 as the offer for the first round (Round 1), $60,000 for the second round (Round 2), and $80,000 for the third round (Round 3).

If desired, in website based systems, an online calculator may be used to notify the sponsor user at that time as to what the sponsor's highest potential exposure might be. For example, if the preestablished conditions are such that the case will settle at the midpoint between the demand and offer if the offer is at least 70% of the demand or within $5,000 of the demand, whichever is greater, a sponsor user who enters $70,000 as the offer for a round may calculate that the possible exposure is $85,000 (corresponding to a $100,000 demand, i.e. the highest demand that will trigger a settlement under these conditions).

Once the claim is entered on the system, the claimant's attorney is contacted, for example by ordinary or electronic mail. (For simplicity, the claimant's attorney will be used but the discussion applies equally to the claimant and to other representatives of the claimant). The claimant's attorney chooses an attorney security code, which is preferably a unique numeric personal identification number ("pin number") that permits the attorney to access the computerized system. The claimant's attorney must also agree to be bound by any settlement achieved by the parties using the computerized system and may also at this time agree to the percentage within which a demand and offer in a round must be for settlement to occur, the formula for determining the amount of the settlement, the amount which may be zero in which the case nonetheless will settle if the difference in the demand and offer in a given round is less than or equal to that amount, and the formula for determining the amount of the settlement in that instance. The claim is now ready for settlement, and the claimant's attorney will preferably have three Rounds, or opportunities, to settle a claim, which may be entered over time or all at once.

Referring now to the block diagram of FIG. 2, the claimant attorney or other user (for example a defendant or sponsor) accesses the system via the Internet using any standard web browser or via an ordinary touch-tone or cellular telephone 20. No special equipment or training is needed by the attorney to use the system. The system "prompts" the attorney at each step of the process and provides automated, on-demand help if needed.

Figure 3:
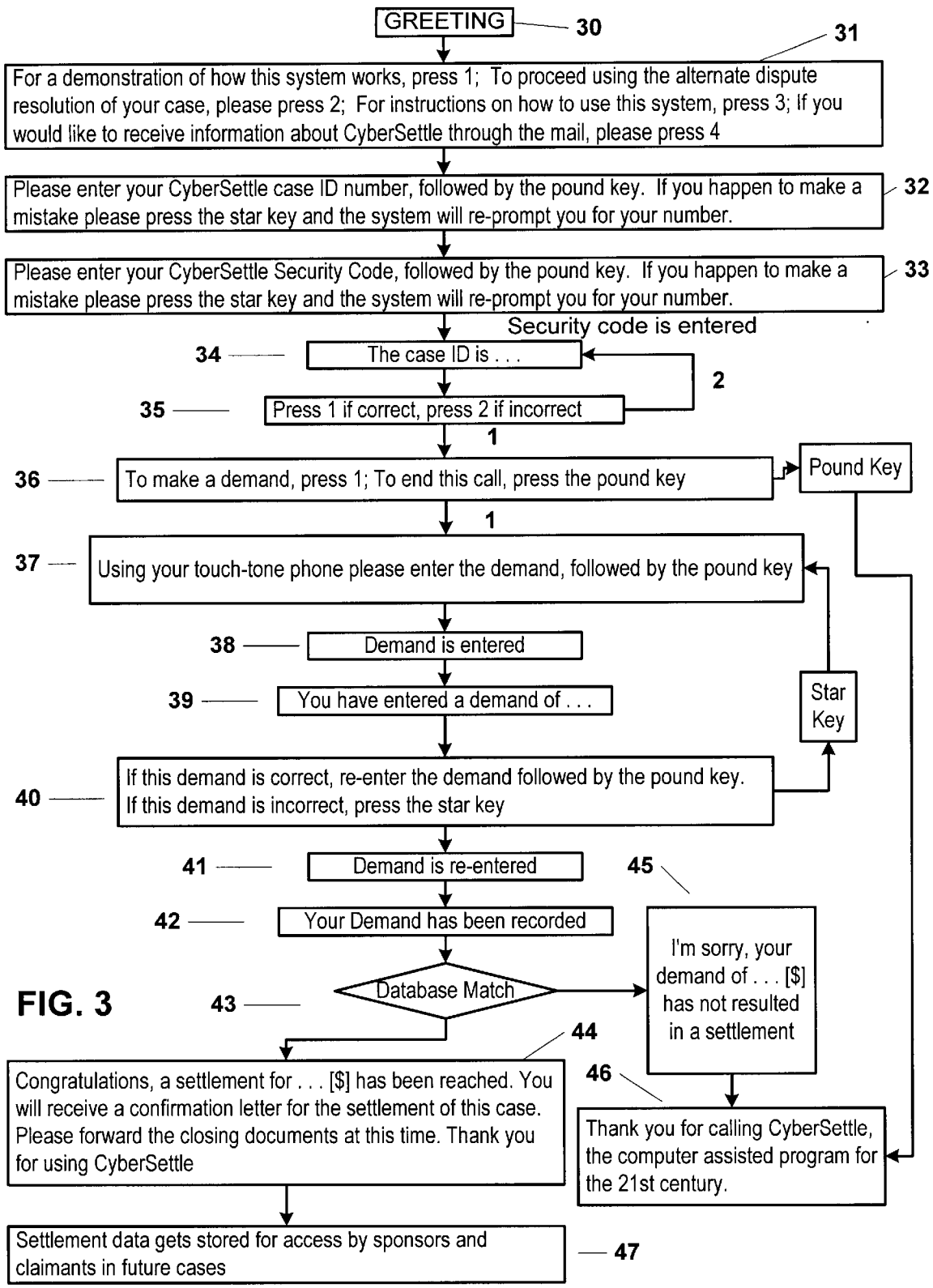
FIG. 3 is a block diagram of an example of how an embodiment of the computerized system of this invention prompts a person involved in a dispute in the use of the system.

For example, referring to the block diagrams of FIG. 2 and FIG. 3, upon accessing the system, the user is met with a greeting 20 (step 30) followed by a number of options 21 that may be selected by pressing the appropriate number of a touch-tone or cellular telephone (step 31).

In steps 32–35, the attorney's pin number and preferably two numeric "passwords" are required to commence the alternate dispute resolution of a claim. The system preferably generates a voice confirmation of the information which the user may confirm or cancel and reenter the information (see step 34). The system may, upon confirmation of the information, determine the correctness of the information and the user's authorization to access the system for that case. After entry and confirmation of the required numbers 22, the attorney follows the prompts and enters demands 23 using the telephone keypad or by typing in the demand at his or her personal computer. The system may also request confirmation of information entered by the attorney. See FIG. 3 for telephone-based embodiments.

The computerized system is designed to adhere to the will of the parties and makes no attempt to "force" a settlement. No information concerning the facts, the law, or the injuries pertaining to the claim is preferably received by the system. The case can be settled only at a figure agreeable to the parties, not at some figure arbitrarily set by an interviewing third party. Thus, the parties can resolve disputes fairly using the system without relinquishing settlement authority.

Rounds may preferably be completed in one, two or three calls or computer sessions within a given time period, preferably thirty days. Once entered, the system instantly compares each demand to the settlement offer for each Round. If the demand and offer match or are within some preestablished range, the case is settled. For example, if the offer is within twenty percent of the demand, the claim is settled in accordance with a preestablished formula, for example the claim is settled for the median amount. If the offer and demand differ by more than twenty percent in all three Rounds, the case will not settle. If the settlement offer is the same as or greater than the claimant's demand, the claim is settled for the demand amount.

Preferably, the preestablished conditions are such that even if the offer and demand differ by more than a preestablished percentage in all three rounds, the claim will nonetheless settle if the offer and demand are within a preestablished amount, for example $5,000, in which case the claim will settle in accordance with a second preestablished formula, which may again be the median amount.

Two examples of a series of rounds and the results are given in Table 1. In these examples, the first preestablished formula is the median amount between the offer and the demand. In Example 2, the preestablished amount is $5,000 and the second preestablished formula is the same as the first preestablished formula, i.e. demand plus offer divided by two equals the settlement amount.

TABLE 1

| Round | Claimant's Demand | Settlement Offer | Result |
|---|---|---|---|
| EXAMPLE 1 (preestablished percentage: 80% of demand) | | | |
| 1 | $200,000 | $40,000 | No settlement |
| 2 | $150,000 | $60,000 | No settlement |
| 3 | $100,000 | $80,000 | Settled for $90,000 |
| EXAMPLE 2 (preestablished percentage: 70% of demand) | | | |
| 1 | $19,000 | $4,500 | No settlement |
| 2 | $14,000 | $6,500 | No settlement |
| 3 | $12,000 | $8,000 | Settled for $10,000 |

Preferably, the system promptly notifies the parties of a settlement, for example while the user is online or via email to offline parties or by telephone, and follows that notice with a written confirmation. Unaccepted offers and demands expire without further action by any party, preferably after thirty (30) days.

The processing of the case data within the present invention begins when a person involved in a dispute, preferably a party representing a person against whom a claim or series of claims is made, for example a sponsor, enters into the central processing unit a series of rounds of offers to settle the dispute (or if the claimant, a series of rounds of demands to satisfy the claim 24). The information as to each claim is submitted electronically in a format compatible with the system, for example via phone input or PC input fed to the central processing unit.

Another person involved in the dispute, for example, a party representing a person asserting a claim enters into the central processing unit a series of rounds of demands to satisfy the claim. The demands and offers are entered without disclosure to other persons involved in the dispute. The series of demands and the series of offers are compared on a round-by-round basis in accordance with preestablished conditions. For example, the parties may agree to be legally bound to settle the case if the demand and the offer in any given round are identical (in which case the claim is settled for that amount) or are within a previously agreed-upon range or formula, for example, within 20% or $5,000 or some combination (in which case the claim is settled in accordance with a previously agreed-upon formula, for example at the midpoint between the demand and the offer). Otherwise, the comparison means goes on to the next round and the previous round that did not result in a settlement is deleted permanently. After each round the system communicates to the parties the result of the comparison, i.e. no settlement or settled at a certain amount.

The computerized alternate dispute resolution method of the present invention may be implemented in Internet-based embodiments using a computer program representing a distributed database application written in a Mark-up Language such as ColdFusion Markup Language and HyperText Markup Language (HTML). The system preferably is distributed through ColdFusion Server extensions which allow for interactive processing and Microsoft's SQLserver to allow attorneys and claims adjusters to access it via a standard web browser such as versions 3.0 and up of Microsoft Internet Explorer and Netscape Navigator, which can be found on a variety of platforms, including Microsoft Windows, Macintosh, and UNIX operating systems.

Information which is entered is submitted to a central database via the Internet. The database preferably indexes sponsors, sponsor users and administrators associated with that sponsor, and cases associated with that sponsor. It also preferably indexes attorneys associated with cases.

Preferably, if a period of time passes without activity when a user is online, for example 20 minutes under normal network traffic conditions, the user is automatically logged out for security precautions. For all or a portion of the data, the system may be designed so that once data has been entered, a sponsor or other user has a period of time, for example 30 minutes, after which the data cannot be withdrawn.

Figure 4:
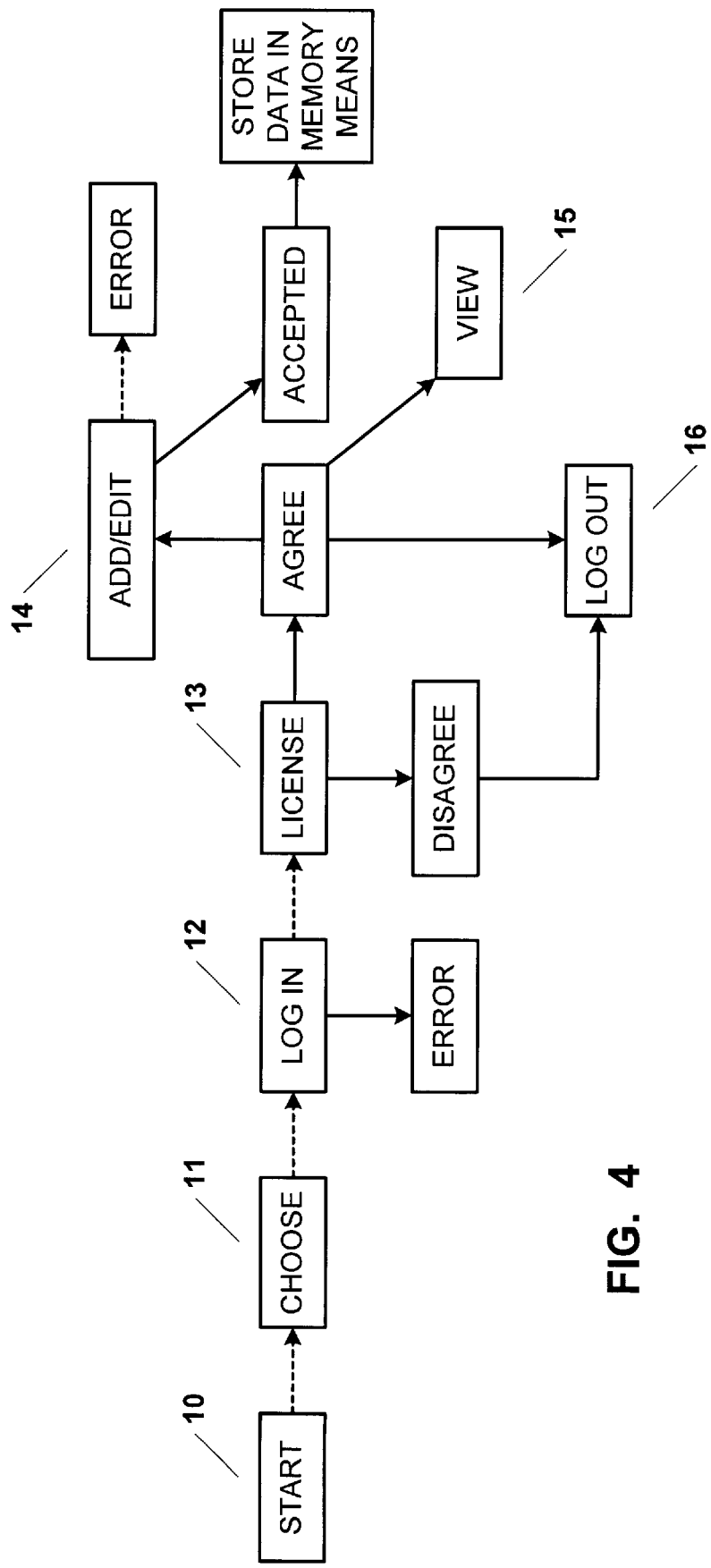
FIG. 4 is a diagram showing the program flow from a user perspective in accordance with a preferred method for operating the system of the present invention via the Internet.

Referring now to the flow chart of FIG. 4, the preferred computer program implementing the system enters at step 10 when a sponsor user opens their web browser (for example Netscape or Microsoft Internet Explorer 3.x or 4.x) and accesses the system website. The user is prompted by a menu with a series of options, one of which is "enter as Sponsor" which is chosen. If desired, the system may automatically write information in the form of ASCII text or "cookies" onto the user's hard drive as a means of keeping track of the user and the user's use of the system. Preferably, the memory means stores this information. Upon access to the system by the user, any preexisting cookies of the user may be modified to reflect the current access of the system by the user. Unless the user has explicitly denied cookies on his or her browser, the computerized system checks for the user's name through a variable saved in the user's browser. If the user has logged in before, the user is greeted by username, provided the user is logging in with the same computer.

In step 11, the sponsor user is presented with the choice of adding/editing cases, viewing all cases for that sponsor, or logout. As mentioned previously, preferably all or a portion of the data in the system may not be withdrawn after a period of time in which event the user will no longer be permitted to modify that information. Preferably a menu is provided in which the user may choose one of two links to separate functions. For example, a menu bar may be provided on the left hand side of the screen in which the user chooses by clicking on the appropriate box in the menu bar corresponding to the function. The user's choice is saved through intermediate login and contract screens which follow. Alternatively, step 11 may be implemented following login (step 12) discussed below.

The program next moves to step 12 in which the user must first log into the system before editing or viewing cases. The user must enter a username (unique to the entire database) and a corresponding password. If these do not match the pairs known by the system, the user is shown an error screen with the option to try again.

Alternately, if the user has logged in before with the same computer, his or her username may already be entered into the system, and the server which distributes the web pages checks the user's password against the username. If desired, the system may be designed so that the user has the option to enter a new or different username to allow multiple users to access the system from the same computer.

Computer program modules preferably are written to implement the various steps of the process. For example, a module controlling the sponsor user identity process may be created to hold all variables related to a sponsor user's identity and to cases of that sponsor.

A "Validate New User Name" module may be created which is called when the user places an entry in the user name field and leaves the field form. Preferably, the user name entry form has a JavaScript object which checks to see if the username has already been taken, and if so, displays an error message.

Step 13 shows the user a system participation agreement if the correct name and password were entered. The agreement preferably details the terms of use of the system and details regarding the process. Preferably, a button is provided on the menu for either agreement or disagreement with the contract. If the user agrees to the terms of the contract, he or she proceeds to the original menu choice (adding/editing cases, or viewing cases). Otherwise, the user is returned to the login screen with all information cleared.

If the user agrees to the participation agreement, the system may send the user to the original menu choice in step 11. Alternatively, the system may be designed to send the user to a menu with the options of assigning a new case, reviewing cases, adding/editing cases or logging out.

If the adding/editing cases choice was originally chosen, the program enters step 14 where an Add/Edit case screen preferably allows the sponsor to enter the following information into the database:

Claimant name

Case Description

Sponsor Case ID

Dollar values for each of 3 settlement rounds The Claimant Attorney name, firm, address, city, state, zip code, telephone, fax, and email In telephone-based embodiments, some or all of this information may be entered with the assistance of system administrators.

The Sponsor case ID is preferably a value for sponsor internal tracking selected by the sponsor.

The dollar value inputs need not all be entered at one time. The system will prompt the user to enter an amount for each round individually with the option to leave the amount in any given round blank for entry at a later time.

The dollar value inputs preferably include calculator functions which calculate the total possible exposure for the amount entered. The screen also may display the status of the case. Upon submitting the information, the user may be returned a confirmation screen with all entered information upon which the user can choose to accept the changes or return to edit the case further. Preferably, the system provides the user with a period of time, for example, thirty minutes, to edit some or all of the case information before that information becomes final. For that information made final, after the period of time has expired, further edits may be done preferably only with the agreement of all the parties.

Preferably, the Add/Edit screen includes a "submit" button at the bottom, which sends the information to be checked for formatting. It points out missing or improperly formatted text, or returns the text for verification. If the text is accepted, the data is sent to the database for entry as an addition or update. Preferably, a sponsor user cannot edit a case in which the claimant attorney has started to submit demands into the system, except to change clerical information such as address and phone number.

A Case Data Entry module may be created to hold a template that processes the sponsor user's entry of case data and add/insert it into the database. The main features of the program are the checking of an expired edit time, and whether or not the claimant attorney has entered a demand in the system. In either event, the form aborts and an error message is presented.

Preferably the program is written so that when a record is to be inserted, the insertion is held up and locked using a suitable program until the system can read the record in order for the details to be displayed back to the user within the screen for confirmation and in order that the system can provide a HREF to its primary key which is automatically assigned by the database.

Another module called "Sponsor Assigns Case" preferably drives the sponsor user's entry of a case into the database.

The Add/Edit calculator may be any suitable computer program, such as a JavaScript program, which applies the algorithm amounts specified by the sponsor to determine the maximum possible exposure.

If the original choice was viewing all cases, the program moves to step 15 where the View cases screen reveals all the information for a given case which has previously been entered during an Add/Edit choice. The user is also preferably given an option to edit the information, preferably with a specified time limit (e.g. 30 minutes) for the rounds of offers provided a claimant attorney has not started to submit demands. The View screen may, if desired, also display a list of cases that have been assigned to a sponsor user.

Preferably, a module called "Sponsor User Show" contains a template which shows the user these records. If the sponsor user has administrator privileges, the module shows all user records related to the sponsor. A similar module called "SponsorShowCases" preferably functions to show case information.

In step 16, the user may log out of the system from a menu choice to end the session and return the user to the login screen. This menu choice preferably also follows completion of the Add/Edit and View choices of steps 14 and 15. If a user attempts to engage the system again, he or she will have to login their user name/password pair. Preferably, logging out clears the password, but not the user name, so that upon subsequent login the computerized system may check for the user's name in the user's cookie if the user accesses the system with the same computer.

The screens appearing in the operation of the system may be created by suitable computer programs written in a Standard Generalized Mark-up Language such as Cold Fusion Script.

The computer program code for the Login screen creates the login form if a user is determined not to be in a logged in state. (FIG. 4, step 12). This form preferably passes on a variable value indicating the user's eventual destination.

The module for the License screen follows the Login program and checks the user's authentication credentials. if the user passes, the License screen is shown (FIG. 4, step 13).

Preferably, a module called Login results follows the License module and sets the user state to logged in. Unless the user has explicitly denied cookies on his or her browser, the program also checks to see if the user's cookie has taken correctly and sends an error message if it does not. If all is correct, the module sends the user on to his or her selected destination.

A Logout module may be used to log a user out of the system. Preferably the next time the user tries to use a menu item, he or she will be prompted for a password and to approve the license agreement.

If the user disagrees with the license, a module following the License module displays the Disagree screen which preferably indicates that the user must agree to the license in order to use the system.

An Access Denied screen may be created to show a user who attempts to access a section he or she does not have authorization for.

A Default page for debugging purposes may also be used to show current user login status. Preferably, this page is for a system administrator, and other users would normally not be able to access this page without mentioning it explicitly.

The above-described steps preferably apply equally to sponsor administrators (sponsor users designated with administrator privileges by the sponsor). However, the system preferably may be designed so that if the user is identified as holding administrator privileges, he or she will see an enhanced version of the sponsor user menu. In addition to providing the user with the option to assign a new case, review cases, and logout, the sponsor administrator menu provides the options to change sponsor information, change his or her own user information, add a user, show/edit users, and remove a user.

If the change sponsor information option is selected, the program sends the user to change the sponsor information screen which allows the user to add/edit sponsor information stored in the database, including Sponsor Name Address City State Zip Code Phone Fax Email If the remove a user option is selected, the program sends the user to user information screens which the sponsor user administrator can use to change, delete, or add information to any sponsor user's record to which they have access for their sponsor.

For example, the user information screen may allow the user to add/edit the following information into the database:

User Name

Sponsor Name

Address

City

State

Zip Code

Telephone

Fax

Email

Username

Password

Active User (yes or no)

Administrator User (yes or no)

Computer modules preferably contain the screen forms for entering and editing sponsor user and new sponsor user information. These modules also may screen users for administrator privileges, for example, before allowing the user to edit records.

Many of the above-described steps preferably also apply to a claimant attorney, i.e. an attorney that represents an individual or company that has dispute or has initiated a lawsuit with a sponsor who has entered into a participation agreement to use the system.

The attorney may be notified, for example, by regular mail, that he or she can login to the website and submit a specified number, for example three, of demands to satisfy a claim according to preestablished conditions. The attorney may be required to sign a participation agreement, preferably mailed to him or her, before given the proper login credentials. Once the attorney signs and forwards the agreement to the system administrators, the attorney is given the proper login credentials.

As in the case of sponsor users, the claimant attorney opens his or her web browser and accesses the system website (See FIG. 4, step 10). The attorney, however, chooses an "enter as Attorney" option provided on the menu that appears.

In step 11, the attorney is presented with the choice of reviewing cases placing demands on cases assigned to the attorney. Preferably a menu is provided in which the user may choose one of three links to separate functions via a menu bar on the left-hand side of the screen. As in the case of the sponsor user, the claimant attorney's choice is saved through intermediate login and contract screens which follow.

The program next moves to step 12 in which the user must first log into the system before making demands or viewing cases. A "Login" computer file for an attorney similar to the "Login" file for the sponsor preferably implements this step. Preferably, the user must enter a case identification number, a security code, for example, an internally generated random number which functions as a password), and an attorney security code (preferably, a code generated by the sponsor). If these do not match the information known by the database, the user is shown an error screen with the option to try again.

As in the case with the sponsor user, step 13 shows the claimant attorney a system participation agreement if the correct name and password were entered with the same options and results discussed previously. A "License" file similar to the "License" file for the sponsor user preferably implements this step.

If the user agrees to the terms of the agreement, he or she proceeds to the original menu choice (reviewing cases or making demands). Alternately, the system may be designed to send the user to a main menu with the options of obtaining case information, placing a demand for the next round of the particular claim or settling a different case. A "Login-Results" file and a "Disagree" file similar to corresponding files for the sponsor user follow the "License" file to implement this step depending on whether the claimant attorney agrees or disagrees. Similarly, "Logout", "Access-Denied", and "Default" files corresponding to similar files for sponsor users preferably are provided.

If the case information option was selected, a case information screen is provided which preferably allows the claimant attorney to view the following information from the database:

Case Name

Status

Claimant Name

Attorney name

Attorney firm

Attorney address

Attorney city

Attorney state

Attorney zip

Attorney telephone

Attorney fax

Attorney email

Preferably, the screen displays the current status of the case with the corresponding details of the case without the ability of the attorney to edit any of this information. A module controlling the case status process may be written to hold all variables related to an attorney's cases. An "AttorneyCaseInfo" module may also be created which displays the information an attorney needs to start making demands against a case. Preferably, the data in the module may not be withdrawn.

If the next round with current case option was chosen, the program moves to a Next Round screen which provides the attorney with the option to place a demand against a particular claim. A "CaseNextRound" module may be created to form a template which determines what the next round is, if any, and places a bid form in front of the user. Preferably, the screen provides a form box in which the attorney places the demand, and if desired menu options to either test the demand against the exposure calculator (preferably implemented by a JavaScript program applying the algorithm amounts specified by the sponsor) to determine the lowest possible amount the case will settle for, or to submit the demand.

After the attorney submits the demand for the next round, the case is submitted to the database for operation by the comparison means. A "CaseNextRound" module may be created to form a template to determine the results of the comparison based on the information that the claimant submitted on the CaseNextRound form and on the preestablished conditions. Preferably, the preestablished conditions are determined on a sponsor by sponsor basis.

If the demand and the corresponding offer by the sponsor for that round are within the preestablished conditions, the user is preferably presented with a case acceptance screen. If the demand and the corresponding offer are not within the preestablished conditions, the user is preferably presented with a link to the next round screen, if a round is available, i.e. the previously agreed number of rounds of demands has not been used. If a round is unavailable, for example, the parties have agreed to three rounds and the claimant attorney has entered three rounds of demands, the user will see a message that the case is now closed in the system.

If the user is presented with the case acceptance screen, the claim is settled and the attorney is notified of the dollar amount of the settlement, and preferably the details of where to send the final settlement request (e.g., the sponsor's address). As shown in FIG. 4, the system preferably is designed so that upon settlement of the claim, data for the settlement is collected and stored in the memory means for access and use by sponsors and claimants in establishing the settlement value in future cases.

Preferably, the system is administrated by a system administrator who may be an employee of a third party who has been granted login rights to the administration function of the system for the purpose of adding sponsors, generating reports, or performing customer service on the website.

The system administrator reaches the website by opening his or her webbrowser, pointing it at the website interface and entering in appropriate identification numbers or passwords identifying him or her as an administrator. A module may be created which contains an administrator form for the assignment or editing of a case.

The administrator may then be presented with an administrator menu which provides the following menu choices:

Sponsor options, including the options to add/edit a sponsor and to show a list and links to all sponsors;

User options, including the options to show users (preferably a list and links to all sponsor users, searchable by user name and sponsor name), to add a new user, and to delete a sponsor user;

Case options, including the options to show cases preferably by a list and links to all cases, searchable by case name, sponsor name, start date, end date and status, to assign a new case, and to delete a case; and Site options (testing modules) including the options to clear cookies for the purpose of losing stored login information, to logout for the purpose of logging out the system and if desired to clear cookies, and to show login status for current login details.

Preferably, modules may be created to facilitate these options. For example, an "AdminNewSponsorUserEntryForm" module may be created which contains an entry form to enter a new sponsor user. Preferably, this form is different from the regular form because of the username checking that occurs during the user's interaction with the page.

An "AdminGetSponsorNewCase" module may be created which chooses a sponsor for the purpose of adding a new case. Preferably, the identity of the sponsor should be known when a case is added so that the case may be properly assigned to a sponsor user.

An "AdminShowCases" module may also be created which shows all open cases in an administrator form. An "AdminSponsorUserDataEntry" module may also be created to hold a template which inserts or updates a sponsor user. The module makes a query to obtain the primary identification of the user, if the system does not have this information, in order for the system to set an edit link.

An "AdminSponsorUserEntryForm" module may also be created to hold a template representing the entry form for sponsor user administrator information. An "AdminUserShow" module may also be created which contains an administrator form to show all users.

A "CaseDataEntry" module may also be created which contains a form to enter/insert cases into the database.

If the Add/Edit a Sponsor option is chosen, an Add/Edit a Sponsor screen preferably appears to allow the administrator to view/edit the following information from the database:

Sponsor name

Address

City

State

Zip Code

Phone

Fax

Mail

Algorithm amount

Algorithm percentage

System ID

Active Account (yes or no)

"SponsorDataEntry", "SponsorEntryForm", and "SponsorShow" modules may be created to add a new sponsor to the database and show a return page, to contain an entry form to enter a new sponsors and to show a table of all sponsors entered into the system.

"ValidateNewUserName" and "ValidateUserName" modules may be created which check to see if a username exists in a sponsor table and if so, display an error message. Preferably, these modules are called from a JavaScript lost focus event. The ValidateNewUserName module preferably gives no consideration to the current username as it assumes that there is none.

The Delete User option provides the administrator with screens in which the administrator can change, delete or add information to any sponsor user's record as in the case with the sponsor administrator's remove a user option. Preferably, a "DeleteUser" module and a "RemoveUser" module may be created which show the form that allows a user to delete a sponsor user and perform the database call to remove a user.

The Add/Edit case option provides the administrator with an Add/Edit case screen similar to the sponsor administrator's Add/Edit Case screen. In addition, the system preferably allows the administrator to add case status information including:

Case Status

Last sponsor edit (date—time)

Edited by

Sponsor name

Last attorney edit (date—time)

Last administrator edit (date—time)

A "DeleteCase" module and a "RemoveCase" module may be created to show the form that allows the user to delete a case and to perform the database call to remove a case.

Preferably, the system also provides a report writer or searchable module of case information for reporting purposes. By querying the report writer, the status of any number of cases may be viewed by the administrator for the purposes of internal reporting.

Preferably, case information may be searched based on the following criteria:

Case Name

Sponsor name

Status

Assigned date (start and finish dates)

Modified criteria (start and finish dates, for example, all records modified in a particular day)

Show only records unmodified by an attorney

The selected platform and hardware to implement the system should be scalable enough to handle large loads of traffic and data, while being responsive to user requests.

Similarly, the database chosen should be scalable enough to handle a distributed data environment, and to be able to handle large loads of data, while being responsive to user requests.

The application server likewise should be scalable enough to handle a distributed data environment, and to be able to handle large loads of data, while being responsive to user requests. Preferably, the application server is a popular platform in which to build applications of this type in order to support future changes, add-ons, modifications, etc.

The server preferably is an open architecture computer that has the ability for failed hardware parts to be replaced swiftly. This configuration also maintains the availability to increase the power of the machine or demand. For example, a computer having an Internal Pentium 400 MHz Processor, with 128 MB SDRAM, two 4.2 Western Digital Hard Drives, a Promise PCI-RAID Level O Controller, a 32xCD-ROM, and 3-COM 10-BaseT Ethernet Card is suitable for use in the system.

The platform for use in the system preferably has the ability to work with open database systems, provide a reliable and scalable platform for intranet and line of business applications, and offer breed file and print services that give users easy and effective access to information and resources. For example, Microsoft Windows NT Server 4.0 system, a powerful multipurpose server operating system, is a suitable platform because of its broad support of many application servers, its scalabilty to support the system of the present invention and its popularity with developers who create applications of this type. The platform preferably integrates the following services into underlying operating system infradtucture:

Built-in networking and communication services

Comprehensive Web services for the Internet and corporate intranets

Complete platform form for distributed applications

Enterprise-wide directory services

Integrated and robust security services

Easy-to-use and flexible management services.

The system of the present invention preferably uses a webserver, such as Microsoft Internet Information Server 4.0, that offers proven scalability and tight integration with the operating system and other products used in the system. The web server preferably includes publishing features, customizable tools, and technologies that permit the creation of Web pages, the publication of information to the World Wide Web, the sharing of files and data on operating systems such as Windows NT, Novell NetWare and UNIX servers, and over numerous databases, including Microsoft SQL Server, Oracle, and Sybase databases, and the search capacity for content in HyperText Markup Language and Microsoft Office document types, and multiple languages.

Preferably, the webserver offers process isolation, a feature which protects applications and Web sites from failure caused by misbehaving components or Web-applications on the server by running them in separate memory spaces. The webserver should also have when combined with the operating system built-in distributed application services that automatically scale to serve thousands of simultaneous users.

Preferably, a high performance, open architecture, scalable database, such as Microsoft SQL Server 6.5, is used in the system.

The computer program is preferably one which provides a scalable platform to deliver high performance Web applications with any major Web server on Windows or Solaris. Allaire ColdFusion Application Server 3.1 and its cooperating ColdFusion Markup Language are suitable for use in developing the system.

Preferably, the system is hosted at a quality data center, such as a worldwide data center company which provides access to the Internet and monitors the servers to ensure that they are responding to Internet requests.

What we claim is:

1. A computer executable method for dispute resolution, operative to control a computer and stored on at least one computer readable medium, the method when executed comprising:

a) receiving a plurality of demands from a first party for a claim;

b) receiving a plurality of settlement offers from a second party for the claim;

c) preventing disclosure of the demands to the second party, and preventing disclosure of the settlement offers to the first party;

d) calculating differences between the demands and the settlement offers in rounds, each of the differences being calculated in a round using one demand and one settlement offer, the one demand and the one settlement offer being unequal in value;

e) determining whether any of the differences fall within at least one predetermined criterion;

f) if any of the differences fall within the at least one predetermined criterion, transmitting a message to the first party and the second party that the claim is resolved; and g) if the differences do not fall within the at least one predetermined criterion, transmitting a message that the claim has not been resolved.

2. The method of claim 1 wherein the one demand is received before the one settlement offer.

3. The method of claim 1 wherein the one demand is received after the one settlement offer.

4. The method of claim 1 further comprising:
   limiting the plurality of settlement offers which may be received to a maximum of three.

5. The method of claim 1 further comprising:
   allowing one of the parties to specify a maximum number of rounds.

6. The method of claim 1 wherein d), e), f) and g) are performed after receiving less than a maximum specified number of the plurality of demands.

7. The method of claim 1 wherein all settlement offers are received before any of the demands are received.

8. An automated method of settling a dispute between at least two parties using monetary demands and settlement offers, comprising:

receiving an engagement request from a first party to engage an automated dispute resolution system, for a claim, and to be bound by a resolution of the claim transmitted from the automated dispute resolution system;

receiving an engagement indication from a second party to engage the automated dispute resolution system for the claim;

receiving a series of at least three monetary demands from the first party;

receiving a series of at least three settlement offers from the second party;

maintaining inaccessibility of the monetary demands from the second party;

maintaining inaccessibility of the settlements offers from the first party;

comparing a first demand of the series of monetary demands with a first settlement offer in a first round to determine if a first difference between the first monetary demand and the first settlement offer is within a predetermined guideline;

if, in the first round, the first difference is within the predetermined guideline, transmitting a successful dispute resolution notification to the first party and the second party;

if, in the first round, the first difference is not within the predetermined guideline, comparing a second demand of the series of monetary demands with a second settlement offer in a second round to determine if a second difference between the second monetary demand and the second settlement offer is within the predetermined guideline;

if, in the second round, the second difference is within the predetermined guideline, transmitting a successful dispute resolution notification to the first party and the second party;

if, in the second round, the second difference is not within the predetermined guideline, comparing a third demand of the series monetary demands with a third settlement offer in a third round to determine if a third difference between the third monetary demand and the third settlement offer is within the predetermined guideline; and if, in the third round, the third difference is within the predetermined guideline, transmitting a successful dispute resolution notification to the first party and the second party.

9. The method of claim 8, wherein if, in all of the first, second and third rounds, the first, second and third differences are not within the predetermined guideline, transmitting an unsuccessful dispute resolution signal to said first party and said second party.

10. The method of claim 8 wherein, if in any round, the successful dispute resolution notification is transmitted, the method further comprises:
    generating a settlement value notification including a settlement amount to be paid to the first party by the second party.

11. The method of claim 10 further comprising:
    calculating the settlement amount using at least the monetary demand from the round in which the successful dispute resolution notification is transmitted.

12. The method of claim 11 wherein the calculating also uses the settlement offer.

13. The method of claim 8 wherein, if, in any of the first, second or third rounds, the successful dispute resolution notification is transmitted, the method further comprises:

calculating a payment value for the claim from a pair of values used in the round for which the successful dispute resolution notification is transmitted; and storing the payment value in an engaging party accessible database.

14. The method of claim 8 wherein in the first round the first difference is not within the predetermined guideline, the method further comprising:

rendering the first monetary demand and the first settlement offer unavailable to the automated dispute resolution system for the second round.

15. The method of claim 14 wherein in the second round the second difference is not within the predetermined guideline, the method further comprising:

rendering the second monetary demand and the second settlement offer unavailable to the automated dispute resolution system for the third round.

16. The method of claim 15 wherein in the third round the third difference is not within the predetermined guideline, the method further comprising:

rendering the third monetary demand and the third settlement offer unavailable to the automated dispute resolution system.

17. The method of claim 10 wherein the settlement amount is a median of one demand and one settlement offer. 0

18. The method of claim 10 wherein the settlement amount is equal to an amount specified by one demand.

19. The method of claim 8 wherein the predetermined guideline is that a single settlement offer and a single demand differ from each other by less than a fixed amount.

20. The method of claim 19 wherein the fixed amount is $5,000.

21. The method of claim 19 wherein the fixed amount is a calculated amount representing a percentage of one of the single settlement offer or the single demand.

22. The method of claim 8 wherein the specified condition is that a single settlement offer is within a predetermined percentage of a single demand.

23. The method of claim 22 wherein the predetermined percentage is 70%.

24. The method of claim 23 wherein the predetermined percentage is 80%.

25. The method of claim 8 wherein one of the series of three monetary demands is received before one of the series of three settlement offers.

26. The method of claim 8 wherein one of the series of three settlement offers is received before one of the series of three monetary demands.

27. A dispute resolution method for resolving a claim between two adverse parties in rounds, the method comprising:

testing a pair of non-equal values in one of at least two rounds, one value in the pair submitted by one of the two adverse parties for the claim; and calculating a binding settlement payment of an amount at least equal to a lower of the pair of the non-equal values, when a settlement determination algorithm used in the testing is satisfied by the pair of the non-equal values.

28. The method of claim 27 further comprising:

limiting the settlement payment to the greater of the pair of non-equal values.

29. The method of claim 27 further comprising:

receiving at least a value of the pair of non-equal values on a weekend day.

30. The method of claim 27 further comprising:

receiving at least a value of the pair of non-equal values at a time other than between 9 a.m. and 4 p.m. on a weekday.

31. The method of claim 27 further comprising:

storing the amount correlated to case specific information in a database.

32. A method of operating a dispute resolution system comprising:

receiving a plurality of values from each of a first and second party to a dispute, at least one of the plurality of values having been received via an internet connection;

matching, on a one for one basis, values from the first party and values from the second party to create a plurality of pairs without disclosing either the first party's values to the second party or the second party's values to the first party;

analyzing pairs in accordance with a preset formula such that if, when analyzed, a pair meets at least one specified criterion, the system will report to the first and second parties that a settlement is reached.

33. The method of claim 32 further comprising:

when the at least one specified criterion is met, calculating a settlement value using at least a part of the pair.

34. The method of claim 33 wherein the calculating comprises:

determining a median value for the pair.

35. The method of claim 32 further comprising:

allowing the first party to make a selection of the preset formula.

36. The method of claim 32 further comprising:

prior to the receiving, requiring one of the first or second parties to make a selection of the preset formula; and requiring another of the first or second parties to agree to the selection.

37. The method of claim 32 further including:

receiving a sponsor identification number for the dispute and case description information.

38. The method of claim 32 further including:

receiving information representing a venue for the dispute.

39. The method of claim 32 further including:

receiving information representing a court for the dispute.

40. A method comprising:

registering a first entity in an automated dispute resolution system with respect to a case involving a claim;

following registration, receiving a case identifier and at least two monetary submissions from the first entity;

associating at least one proposed settlement amount submitted by a second entity with respect to the claim with at least one of the at least two monetary submissions;

processing a proposed settlement amount and one of the at least two monetary submissions in accordance with a specified algorithm to obtain a result; and notifying the first entity that a settlement of the claim has been reached and of a payment amount, when the result meets a criterion agreed to by the first entity, without ever informing the first entity of the at least one proposed settlement amount.

41. The method of claim 40 further comprising:
permanently discarding the at least one proposed settlement amount and the one of the at least two monetary submissions when the settlement has been reached.

42. The method of claim 40 further comprising:
storing case related information for the settlement and the payment amount in the automated dispute resolution system for tabulation.

43. A dispute settlement method comprising:
receiving offers and demands with respect to a claim, each of the offers having been received via a password protected communication linkage and having an associated sequence number, and each of the demands having an associated sequence number;
matching offers against demands based upon a correspondence between the sequence numbers;
testing matched offers and demands against an algorithm;
generating a result in response to a testing of an offer and a demand; and
automatically reporting the result, without disclosing the offer or demand.

44. The method of claim 43 wherein, when the result is no settlement, the method further comprises:
discarding the offer and the demand.

45. The method of claim 43 wherein, when the result is a settlement, the method further comprises:
calculating a settlement amount according to a preestablished formula; and
reporting the settlement amount.

46. The method of claim 43 further comprising:
obtaining an agreement from a claimant to participate in an indirect settlement negotiation using an on-line dispute settlement system and, when the result indicates a settlement, to be legally bound to settle the claim for an amount specified by the on-line dispute settlement system.

47. The method of claim 43 further comprising:
obtaining an agreement from a sponsor to participate in an indirect settlement negotiation;
generating an exposure amount using an offer submitted by the sponsor; and
informing the sponsor of the exposure amount.

48. The method of claim 46 further comprising:
generating a potential settlement gain amount using a demand; and
informing the claimant of the settlement gain amount.

49. A method comprising:
agreeing to at least one criterion which, when applied by a dispute resolution system to values and satisfied, will result in a settlement of a claim against a party for a payment amount specified by the dispute resolution system, the payment amount being derived from at least one of the values;
submitting a plurality of monetary values to the dispute resolution system via a security protected on line interface, which will be analyzed by the dispute resolution system using the at least one criterion without revealing any of the monetary values to the party;
receiving an indication that the at least one criterion is satisfied by an unrevealed value from the party and at least one of the plurality of monetary values; and
receiving a notification of the payment amount for the claim.

50. The method of claim 49 wherein, prior to receiving the indication, the method includes:
receiving a message that the at least one criterion has not been satisfied for one unrevealed value for the party and one monetary value.

51. The method of claim 49 wherein the payment amount is at least one of the plurality of monetary values.

52. The method of claim 49 wherein the payment amount is greater than the at least one of the plurality of monetary values.

53. The method of claim 49 further including:
logging in to the dispute resolution system through the internet.

54. The method of claim 49 further including:
providing claim specific identification information.

55. The method of claim 49 further including:
providing attorney contact information for the claim.

56. The method of claim 54 further including:
tabulating the claim specific information.

57. The method of claim 49 further including:
accessing the dispute resolution system using a web browser.

58. The method of claim 49 further including:
submitting a plurality of cases to the dispute resolution system, the claim relating to one of the plurality of cases.

59. A method comprising steps, stored in an automated dispute resolution system including a processor and storage, for dispute resolution, the method comprising:
a step of executing a first program module, written in a markup language, for receiveing values submitted by a party via the internet, the values representing a series of proposed amounts for which a claim would be settled;
a step of executing a program object, written in an object oriented programming language, for sequentially comparing individual proposed amounts of the series of proposed amounts against individual proposed counter amounts of a series of proposed counter amounts, all of the proposed counter amounts being unavailable to the party, in order to determine if a difference between and of the sequentially compared individual proposed amounts and counter amounts is within a specified range and for generating a settlement indication if the difference is within the specified range; and
a step of executing a second program module for informing the party that the claim is settled by a payment of a calculated amount.

60. The method of claim 59 further including:
a step for calculating a settlement amount according to a specified formula using an individual proposed amount as an input for the specified formula for specifying a payment to be made in settlement of the claim.

61. The method of claim 59 further including:
a step for calculating a settlement amount according to a specified formula using an individual proposed counter amount as an input for the specified formula for specifying a payment to be made in settlement of the claim.

62. The method of claim 59 further including:
a step for calculating a settlement amount according to a specified formula using both an individual proposed amount and an individual proposed counter amount as an input for the specified formula for specifying a payment to be made in settlement of the claim.

63. The method of claim 59 further including:

a step for logging the party in.

64. The method of claim 59 further including:

a step for collecting and processing settlement data using the processor.

65. The method of claim 59 further including:

a step for checking administration authorization to enable an administrator to add a sponsor into the automated dispute resolution system.

66. A method comprising:

receiving a submission of a case from a sponsor;

receiving an agreement to at least one criterion which, if satisfied, would result in a binding settlement of the case;

generating a message for communication to a representative of a claimant involved in the case which invites the representative to participate in an automated dispute resolution negotiation for the case;

receiving a responsive agreement from the representative to participate and to be bound by the automated dispute resolution negotiation, if the at least one criterion is satisfied by demands submitted by the representative and correlated offers submitted by the sponsor;

receiving at least two demands submitted by the representative and an offer submitted by the sponsor, within a specified limited time period;

comparing one of the demands and the offer in a round of at least two rounds to determine if the at least one criterion is satisfied; and if the at least one criterion is satisfied, generating an indication that the case is settled for a payment amount.

67. The method of claim 66 further comprising:

requiring entry of a dispute identification number prior to receiving the demand and the offer.

68. The method of claim 66 further comprising:

storing the payment amount for future retrieval.

69. The method of claim 66 further comprising:

calculating the payment amount as a median of the one demand and the offer.

70. The method of claim 66 further comprising:

calculating the payment amount as a value between the demand and the offer.

71. A method comprising:

receiving first signals including data representing a series of monetary amounts for a claim from a first entity;

preparing the first signals for automated testing against an algorithm by a dispute resolution system in conjunction with information from a second entity, the second entity being adverse to the first entity with respect to the claim;

receiving a response signal indicating that a test of one of the series of monetary amounts caused a settlement condition in the dispute resolution system;

forwarding a message including data representing a settlement amount, in response to the settlement condition, for ultimate delivery to the first entity.

72. The method of claim 71 further including:

receiving second signals including the information from the second entity, the information having data representing at least one proposed settlement amount for the claim.

73. The method of claim 71 wherein the first entity is one of a claimant, a representative of a claimant, or an attorney for the claimant.

74. The method of claim 73 wherein the second entity is one of an insurer, a claims adjuster, an attorney for an insurer, a sponsor, a sponsor administrator, a system administrator, or an agent of a self-insured organization.

75. The method of claim 71 wherein the first entity is one of an insurer, a claims adjuster, an attorney for an insurer, a sponsor, a sponsor administrator, a system administrator, or an agent of a self-insured organization.

76. The method of claim 71 further including:

forwarding cookie data sent by the dispute resolution system for storage on a hard drive associated with either the first or second entity usable by the dispute resolution system to track usage by the first or second entity.

77. A method of claim 76 further including:

receiving third signals from the dispute resolution system for forwarding to a computer associated with either the first or the second entity which, when received, would cause the computer to retrieve the cookie data from the hard drive and send it to the dispute resolution system.

78. A method comprising:

a) receiving first signals over a communications linkage from an insurer, the signals including data communicated for temporary storage, the data representing two values usable as offers to settle a claim, one of the two values being greater than the other of the two values;

b) sending a request to a claimant to submit demands representing different monetary amounts for which the claimant would settle the claim, without revealing any of the offers to the claimant;

c) receiving second signals representing a response from the claimant, the signals including a monetary demand;

d) comparing the monetary demand with a first of the offers and, if the comparison is within specified guidelines, informing the claimant, via transmitted information displayable on a web browser, that the claim will be settled for a specified amount that is calculated using at least the demand, otherwise, prompting the claimant to submit a new demand.

79. The method of claim 78 further comprising:

if the comparison is within specified guidelines, informing the insurer by mail that the claim will be settled for the specified amount.

80. The method of claim 78 further comprising:

prior to receiving the first signals, providing access to tabulated information from a plurality of settled cases.

81. The method of claim 78 further comprising:

tabulating case specific information from a plurality of settled cases for which specified amounts were calculated, so that the case specific information is accessible according to categories.

82. The method of claim 81 wherein the categories include at least one of:

a court, a venue, an attorney, a settlement payment amount, and a sponsor.

83. A method of automated on-line dispute resolution comprising:

maintaining an interface to the internet through which a claimant can submit demands for a claim to a dispute resolution system and receive indications therefrom such that, when the claimant submits multiple demands via the interface to the dispute resolution system and the dispute resolution system pairs the multiple demands with offers of settlement for the claim on a one-to-one basis, a comparison will be performed in accordance with at least one criterion and the claimant will be provided with either a positive or negative indication, via the interface, as to whether or not the at least one criterion is satisfied for a pair.

84. The method of claim 83 further comprising:

forwarding received information, via the interface, for display to the claimant including a settlement value supplied by the dispute resolution system calculated when the at least one criterion is satisfied.

85. The method of claim 83 further comprising:

hosting the dispute resolution system.

86. The method of claim 83 further comprising:

storing a processor executable program which, when executed, performs the comparison and provides the claimant with the either positive or negative indication for the claim.

87. A system comprising:

a first value, selected from at least two values submitted on line by a first entity;

a second value submitted on line by a second entity, the first value being inaccessable to the second entity and the second value being inaccesssible to the first entity, the first value and the second value bien different in magnitude from each other;

a proxy including an input, an output and a computer executable program, the program being structured to, when executing, accept a pair of values from adverse entities via the input and return a result indicator to the proxy based upon a mathematical comparison of the pair of values in a round of at least two rounds, the program being further structured to provide a payment value for the clim to at least one of the adverse entities via the output when the result indicator indicates that at least one of the adverse entities via the output when the result indicator indicates that at least one predetermined criterion is satisfied for one of the at least two rounds.

88. The system of claim 87 further including processor accessible storage configured to temporarily store the first and second values for retrieval by the proxy via the input.

89. The system of claim 87 wherein the computer executable program includes a plurality of modules, one of which is programmed in an object oriented programming language and another of which is programmed in a markup language.

90. The system of claim 89 wherein the object oriented programming language includes JAVAScript.

91. The system of claim 89 wherein the markup language is ColdFusion Markup Language.

92. The system of claim 89 wherein the markup language is Hyper Text Markup Language (HTML).

93. The system of claim 87 wherein, when the program is executed and the result indicator indicates that the at least one predetermined criterion is not satisfied, the proxy discards the pair of values.

94. The system of claim 87 wherein, when the program is executed and the result indicator indicates that the at least one predetermined criterion is satisfied, the proxy calculates the payment value from the pair of values and then discards the pair of values.

95. The system of claim 87 wherein the first value is an offer made by a sponsor and the second value is a demand made by a claimant.

96. The system of claim 87 further including an entity accessible detail log including a correlation of payment values and claim specific information.

97. The system of claim 96 wherein the claim specific information includes data indicative of a geographic area.

98. The system of claim 96 further including proxy accessible storage into which the proxy can store the payment value and data representing claim specific information when the result indicator indicates that the at least one predetermined criterion is satisfied.

99. The system of claim 87 wherein the pair of values is the first and second values, the at least one predetermined criterion is satisfied and the payment value is the median of the first and second values.

100. The system of claim 87 wherein the pair of values is the first and second values, the at least one predetermined criterion is satisfied and the payment value is the greater of the first and second values.

101. The system of claim 87 wherein the at least one predetermined criterion is that the pair of values must be within a fixed percentage of each other.

102. The system of claim 101 further including a predetermined override amount which will be compared to a differential between the pair of values if the result indicator indicates that the at least one predetermined criterion is not satisfied and, if the differential is less than the predetermined override amount, will cause the proxy to provide the payment value for the claim to at least one adverse entity even though the at least one predetermined criterion was not satisfied.

103. The system of claim 101 wherein the pair of values is the first and second values, the at least one predetermined criterion is satisfied and the payment value is the median of the first and second values.

104. The system of claim 101 wherein the pair of values is the first and second values, the at least one predetermined criterion is satisfied and the payment value is the greater of the first and second values.

105. The system of claim 101 wherein the pair of values is the first and second values, the at least one predetermined criterion is satisfied and the payment value is a function of the first and second values.

106. The system of claim 87 wherein the at least one predetermined criterion is a fixed spread value.

107. The system of claim 87 wherein the payment value is of a magnitude between one of the values in the pair of values and another of the values in the pair of values.

108. The system of claim 88 further including a program execution limit which provides a limit on a number of times the proxy will accept the pair of values.

109. The system of claim 108 wherein, the predetermined action is a discarding of the at least one of the first or second values.

110. The system of claim 108 wherein the first and second values are withdrawable and the predetermined action prevents a withdrawal of one of the first or second values.

111. The system of claim 88 further including an entity accessible detail log including a correlation of payment values and claim specific information.

112. The system of claim 111 wherein the entity accessible detail log is written in a markup language.

113. The system of claim 87 further including an exposure calculator.

114. The system of claim 113 wherein the exposure calculator is written in an object oriented programming language.

115. The system of claim 114 wherein the object oriented programming language includes JAVAScript.

116. The system of claim 87 wherein the first value is one of a plurality of sequentially submitted first values and the second value is one of a plurality of sequentially submitted second values, all of the sequentially submitted values being inaccessible to the entity that did not submit them, and wherein the program is further structured to utilize another of the plurality of sequentially submitted first values, specified by the first entity, in place of the first value and another of the plurality of sequentially submitted second values, specified by the second entity, in place of the second value when the result indicator indicates that the at least one predetermined criterion is not satisfied for the first and second values.

117. The system of claim 116 wherein each of the plurality of first values is submitted by the first entity according to a specified order.

118. The system of claim 87 further including a program execution limit which provides a limit on a number of times the proxy will accept the pair of values.

119. The system of claim 118 wherein the program execution limit is three.

120. The system of claim 116 wherein the plurality of first values submitted by the first entity is two.

121. The system of claim 87 further including a payment calculator which, when the at least one predetermined criterion has been satisfied, will calculate, in accordance with a formula, a monetary amount to be paid by one entity to the other to settle the claim.

122. The system of cliam 121 wherein the formula is a median of the pair of values which caused the at least one predetermined criterion to be satisfied.

123. The system of claim 121 wherein the formula is the greater of the pair of values which caused the at least one predetermined criterion to be satisfied.

124. The system of claim 116 further including an entity searchable database including data relating to settled claims.

125. The system of claim 124 wherein the data includes geographic information for each settled claim.

126. The system of claim 124 wherein the data includes a monetary amount for each settled claim.

127. The system of claim 124 wherein the system further includes a communication link over which the entity searchable database can be accessed by an entity prior to submitting an offer or a demand.

128. The system of claim 116 wherein the first plurality of values are demands from a claimant.

129. The system of claim 116 wherein the first plurality of values are offers from an insurer.

130. The system of claim 87 wherein the first value is one of a plurality of sequentially submitted first values and the second value is one of a plurality of sequentially submitted second values, all of the sequentially submitted values being inaccessible to the entity that did not submit them, and wherein an acceptance of a pair of values by the program along with the returning of the result indicator constitutes a round.

131. A dispute resolution application stored on at least one computer accessible storage medium for execution by a processor comprising:
 a plurality of modules which, when executed by the processor:
  accepts and compares paired monetary values submitted by two entities adverse to each other with respect to a claim,
  discards the paired monetary values which differ from each other by more than a specified range,
  calculates a settlement amount to be paid by one entity to another entity if a pair of the monetary values differ from each other within the specified range based upon the pair and then discards the pair, and
  provides the settlement amount for delivery to the two entities.

132. A method of automated dispute resolution in a system with at least one central processing unit comprising:
 (a) introducing into the central processing unit, information corresponding to a series of rounds of demands to satisfy a claim received from a first party for a dispute without disclosure of the demands to any parties adverse to the first party in the dispute;
 (b) introducing into the central processing unit, information corresponding to a series of rounds of offers to settle the claim received from a second party, adverse to the first party, for the dispute without disclosure of the offers to any parties adverse to the second party in the dispute;
 (c) steps (a) and (b) occuring in any order;
 (d) comparing the information corresponding to the series of demands and the series of offers on a round-by-round basis in accordance with preestablished conditions;
 (e) determining, using the central processing unit, if a settlement of the dispute is caused by a demand and an offer in a round by meeting the preestablished conditions;
 (f) if the demand and the offer in the round cause the settlement, calculating a settlement payment equal to one of:
  (i) a first amount, calculated in accordance with a first preestablished formula, of the offer in the round is less than the demand and within a preestablished percentage of the demand in the same round, or
  (ii) the demand, if the offer in the round is the same as or greater than the demand, or
  (iii) a second amount, calculated in accordance with a second preestablished formula, if the offer is not within the preestablished percentage of the demand in all individual rounds but the difference between a particular offer and a corresponding demand is less than a preestablished amount;
 (g) permanently deleting the series of demands and the series of offers when either none of the series of demands and series of offers meet the preestablished conditions of the settlement payment has been calculated; and
 (h) communicating either failure to settle message, when none of the series of demands and series of offers meet the preestablished conditions and every difference between individual unsuccessful offers and corresponding demands is greater that a preetablished amount, or a settlement message inluding the settlement payment, when the preestablished conditions are met or the offer is not within the preestablished percentage of the demand in all rounds but the difference between the particular offer and the corresponding demand is less than the preestablished amount.

133. A system for automated dispute resolution comprising:
 a processor for processing demands and offers;
 means for introducing to the processor, via a communications linkage, information identifying a dispute, a series of demands to satisfy a claim made by or on behalf of a person involved in the dispute, and a series of offers to settle the claim by an entity adverse to the person for the claim;
 memory means, accessible by the processor, for storing the information identifying the dispute and for temporarily storing the series of demands to satisfy the claim and the series of offers to settle the claim for use by the processor in a series of rounds without disclosure of the series of demands to the adverse entity or series of offers to the person;

comparison means, in communicating relationship with the processor, for receiving and comparing one of the series of demands and one of the series of offers, against each other on a round-by-round basis, in accordance with preestablished conditions until either all of the series of demands and series of offers have been exhausted or a settlement is indicated for a demand and an offer in a round, such that, if the settlement is indicated the claim is settled for:

(a) an amount, in accordance with a first preestablished formula, if the offer in the round in which the preestablished condition is met is less than the demand and within a preestablished percentage of the demand in the round, (b) the demand, if the offer in any round is the same as or greater than the demand, and (c) an amount in accordance with a second preestablished formula, if the offer is not within the preestablished condition in all rounds but the difference between a particular offer and a corresponding demand is less than a preestablished amount;

means for permanently inhibiting a reuse of an unsuccessful demand, or unsuccessful offer, by the comparison means in a subsequent round; and means for communicating a result of the comparison to the person and the entity.

134. The system of claim 133 further comprising means for accessing actual settlements from other disputes.

135. The system of claim 133 wherein the communication linkage is an internet connection.

136. The system of claim 133 wherein the communication linkage is a voice connection.

137. The system of claim 133 wherein the series of offers to settle the claim comprise three settlement offers.

138. The system of claim 133 further comprising:

means for generating voice messages through a telephone linkage for guiding a user in a use of the system.

139. The system of claim 133 further comprising:

security means for preventing an access of the system until provision to the system of at least one of:

a) a case identification number identifying the dispute, b) a security code corresponding to the dispute, or c) an administrator code for the person or the entity.

140. The system of claim 133 further comprising time keeping means for associating an entry time with at least a first of the series of demands to satisfy the claim and at least a first of the series of offers to settle the claim.

141. The system of claim 133 wherein all of the series of demands and the series of offers are received by the system at different times.

142. A computerized system for automated dispute resolution through a communications linkage for communicating and processing a series of demands to satisfy a claim made by or on behalf of a person involved in a dispute with at least on other person and a series of offers to settle the claim through at least one central processing unit including operating system software for controlling the central processing unit, means for introducing information into the central processing unit corresponding to the identification of the dispute and the persons involved in the dispute, memory means for storing the information corresponding to the identification of the dispute and the persons involved in the dispute, means for introducing by or on behalf of a first person involved in the dispute against whom a claim is made information into the central processing unit corresponding to a series of rounds to settle a claim without disclosure of the offers to other persons involved in the dispute, means for introducing by or on behalf of a second person involved in the dispute information into the central processing unit corresponding to a series of rounds of demands to satisfy the claim without disclosure of the demands to other persons involved in the dispute, comparison means for comparing the information corresponding to the series of demands and the series of offers on a round-by-round basis in accordance with preestablished conditions including (a) that the claim is settled for an amount in accordance with a first preestablished formula if the offer in any round is less than the demand and within a preestablished percentage of the demand in the same round;

(b) that the claim is settled for the demand amount if the offer in any round is the same as or greater than the demand; and (c) that the claim is not settled if the offer is not within the preestablished percentage of the demand in all rounds unless the difference between the offer and demand is less than a preestablished amount in which case the claim is settled for an amount, in accordance with a second preestablished formula, means for permanently deleting the demand and the offer in each round that does not result in a settlement upon comparison of the demand and the offer in said round based upon said preestablished conditions, and means for communicating to the first and second persons or representatives thereof the results of the comparison.

143. A computerized system as defined in claim 142 further comprising means for accessing actual settlements generated by the system in other disputes.

144. A computerized system as defined in claim 142 wherein said persons communicate via the Internet to said central processing unit.

145. A computerized system as defined in claim 142 wherein said persons communicate via telephone to said central processing unit.

146. A computerized system as defined in claim 142 wherein the central processing unit has received information corresponding to three settlement offers.

147. A computerized system as defined in claim 142 comprising means for gernerating voice messages to a person commmunicating with the system through a touch-tone or cell phone linkage to guide the person in the use of the system.

148. A computerized system as defined in claim 142 comprising security means whereby the system is accessible only upon entry of a case identification number identifying the dispute, a security code corresponding to the dispute, and a user security code corresponding to the dispute and identifying the person or representative thereof who is making the demand or offer.

149. A computerized system as defined in claim 142 comprising time keeping means to record the introduction of the information corresponding to the demands or offers over a period of time.

150. A computerized system as defined in claim 142 wherein introduction of information corresponding to demands or offers may be made in a plurality of communications with the system over a period of time.

151. The system of claim 148 wherein the markup language is Hyper Text Markup Language (HTML).

152. A method comprising:
receiving a submission of a case from a sponsor;
receiving an agreement to at least one criterion which, if satisfied, would result in a binding settlement of the case;
generating a message for communication to a representative of a claimant involved in the case which invites the representative to participate in an automated dispute resolution negotiation for the case;
receiving a responsive agreement from the representiative to participate and to be bound by the automated dipute resolution negotiation, if the at least on critireon is satisfied by demands submitted by the representative and correlated offers submittec by the sponsor;
receiveing a demand submitted by the representative and at least two offers submitted by the sponsor, within a specified limited time period;
comparing the demand and one of the offers in a round of at least two rounds to determine if the at least one criterion is satisfied; and
if the at least one criterion is satisfied, generating an indication that the case is settled for a payment amount.

153. The method of claim 152 further comprising:
requiring entry of a dispute identification number prior to receiving the demand and the offer.

154. The method of claim 152 further comprising:
storing the payment amount for future retrieval.

155. The method of claim 152 further comprising:
calculating the payment amount as a median of demand and the offer.

156. A system comprising:
a first value, submitted on line by a first entity;
a second value, selected from at least two values submitted on line by a second entity, the first and second entities being adverse to each other wit respect to a claim, the first value being inaccessible to the second entity and the second value being inaccessible to the first entity, the first value and the second value being different in magnitude from each other;
a proxy including an input, an output and a computer executable program, the program being structured to, when executing, accept a pair of values from adverse entities via the input and return a result indicator to the proxy based upon a mathematical comparison of the pair of values in a round of at least two rounds, the program being further structured to provide a payment value for the claim to at least one of the adverse entities via the output when the result indicator indicates that at least one predetermined criterion is satisfied for one of the at least two rounds.

157. The system of claim 156 further including processor accessible storage configured to temporarily store the first and second values for retrieval by the proxy via the input.

158. The system of claim 156 wherein the computer executable program includes a plurality of modules, one of which is programmed in an object oriented programming language and another of which is programmed in a markup language.

159. The system of claim 158 wherein the object oriented programming language includes JAVAScript.

160. The system of claim 158 wherein the markup language is ColdFusion Markup Language.

161. The system of claim 158 wherein the markup language is Hyper Text Markup Language (HTML).

162. The system of claim 156 wherein, when the program is executed and the result indicator indicates that the at least one predetermined criterion is not satisfied, the proxy discards the pair of values.

163. The system of claim 156 wherein, when the program is executed and the result indicator indicates that the at least one predetermined criterion is satisfied, the proxy calculates the payment value from the pair of values and then discards the pair of values.

164. The system of claim 156 wherein the first value is an offer made by a sponsor and the second value is a demand made by a claimant.

165. The system of claim 156 further including an entity accessible detail log including a correlation of payment values and claim specific information.

166. The system of claim 165 wherein the claim specific information includes data indicative of a geographic area.

167. The system of claim 165 further including proxy accessible storage into which the proxy can store the payment value and data representing claim specific information when the result indicator indicates that the at least one predetermined criterion is satisfied.

168. The system of claim 156 wherein the pair of values is the first and second values, the at least one predetermined criterion is satisfied and the payment value is the median of the first and second values.

169. The system of claim 156 wherein the pair of values is the first and second values, the at least one predetermined criterion is satisfied and the payment value is the greater of the first and second values.

170. The system of claim 156 wherein the at least one predetermined criterion is that the pair of values must be within a fixed percentage of each other.

171. The system of claim 170 further including a predetermined override amount which will be compared to a differential between the pair of values if the result indicator indicates that the at least one predetermined criterion is not satisfied and, if the differential is less than the predetermined override amount, will cause the proxy to provide the payment value for the claim to at least one adverse entity even though the at least one predetermined criterion was not satisfied.

172. The system of claim 170 wherein the pair of values is the first and second values, the at least one predetermined criterion is satisfied and the payment value is the median of the first and second values.

173. The system of claim 170 wherein the pair of values is the first and second values, the at least one predetermined criterion is satisfied and the payment value is the greater of the first and second values.

174. The system of claim 170 wherein the pair of values is the first and second values, the at least one predetermined criterion is satisfied and the payment value is a function of the first and second values.

175. The system of claim 156 wherein the at least one predetermined criterion is a fixed spread value.

176. The system of claim 156 wherein the payment value is of a magnitude between one of the values in the pair of values and another of the values in the pair of values.

177. The system of claim 156 further comprising:
claim specific data indicative of a geographic area.

178. The system of claim 157 further including a time indicator which, when exceeded, will cause the proxy to take a predetermined action with regard to at least one of the first or second values.

179. The system of claim 178 wherein, the predetermined action is a discarding of the at least one of the first or second values.

180. The system of claim 178 wherein the first and second values are withdrawable and the predetermined action prevents a withdrawal of one of the first or second values.

181. The system of claim 157 further including an entity accessible detail log including a correlation of payment values and claim specific information.

182. The system of claim 181 wherein the entity accessible detail log is written in a markup language.

183. The system of claim 156 further including an exposure calculator.

184. The system of claim 183 wherein the exposure calculator is written in an object oriented programming language.

185. The system of claim 184 wherein the object oriented programming language includes JAVAScript.

186. The system of claim 156 wherein the first value is one of a plurality of sequentially submitted first values and the second value is one of a plurality of sequentially submitted second values, all of the sequentially submitted vlaues being inaccessible to the entity that did not submit them, and wherein the program is further sturctured to utilize another of the plurality of sequentially submitted first values, specified by the first entity, in place of the first value and another of the plurality of sequentially submitted second values, specified by the second entity, in place of the second value when the result indicator indicates that the at least one predetermined criterion is not satisfied for the first and second values.

187. The system of claim 186 wherein each of the plurality of first values is submitted by the first entity according to a specified order.

188. The system of claim 156 further including a program execution limit which provides a limit on a number of times the proxy will accept the pair of values.

189. The system of claim 188 wherein the program execution limit is three.

190. The system of claim 186 wherein the plurality of first values submitted by the first entity is two.

191. The system of claim 156 further including a payment calculator which, when the at least one predetermined criterion has been satisfied, will calculate, in accordance with a formula, a monetary amount to be paid by one entity to the other to settle the claim.

192. The system of claim 191 wherein the formula is a median of the pair of values which caused the at least one predetermined criterion to be satisfied.

193. The system of claim 191 wherein the formula is the greater of the pair of values which caused the at least one predetermined criterion to be satisfied.

194. The system of claim 186 further including an entity searchable database including data relating to settled claims.

195. The system of claim 194 wherein the data includes geographic information for each settled claim.

196. The system of claim 194 wherein the data includes a monetary amount for each settled claim.

197. The system of claim 194 wherein the system further includes a communication link over which the entity searchable database can be accessed by an entity prior to submitting an offer or a demand.

198. The system of claim 186 wherein the first plurality of values are demands from a claimant.

199. The system of claim 186 wherein the first plurality of values are offers from an insurer.

200. The system of claim 156 wherein the first value is one of a plurality of sequentially submitted first values and the second value is one of a plurality of sequentially submitted second values, all of the sequentially submitted values being inaccessible to the entity that did not submit them, and wherein an acceptance of a pair of values by the program along with the returning of the result indicator constitutes a round.

* * * * *

UNITED STATES PATENT AND TRADEMARK OFFICE
CERTIFICATE OF CORRECTION

PATENT NO.    : 6,330,551 B1
DATED         : December 11, 2001
INVENTOR(S)   : James D. Burchetta et al.

It is certified that error appears in the above-identified patent and that said Letters Patent is hereby corrected as shown below:

Column 20,
Line 20, replace "settlements" with -- settlement --.

Column 21,
Line 33, delete "0".
Line 61, replace "rounds, one" with -- rounds using a processor, one --.

Column 24,
Line 43, replace "between and" with -- between any --.

Column 27,
Line 21, after "second entity," insert -- the first and second entities being adverse to each other with respect to a claim, --.
Line 24, replace "bien" with -- being --.
Line 33, replace "clim" with -- claim --.
Line 32, delete "at least one of the adverse entities via the output when the result indicator indicates that" should read -- via the output when the result indicator indicates that at least one predetermined criterion is satisfied for one of the at least two rounds. --.

Column 28,
Line 43, delete entire claim 108, and insert the following claim:
108.    The system of claim 88 further including a time indicator which, when exceeded, will cause the proxy to take a predetermined action with regard to at least one of the first or second values.

Column 30,
Line 27, (element (f)(i)), replace "formula, of" with -- formula, if --.
Line 41, (element (g)), replace "conditions of" with -- conditions or --.
Line 39, (element (h)), after "either" insert -- a --.
Line 47, (element (h)), replace "that" insert -- than --.

UNITED STATES PATENT AND TRADEMARK OFFICE
CERTIFICATE OF CORRECTION

PATENT NO.     : 6,330,551 B1
DATED          : December 11, 2001
INVENTOR(S)    : James D. Burchetta et al.

It is certified that error appears in the above-identified patent and that said Letters Patent is hereby corrected as shown below:

<u>Column 31,</u>
Line 48, after "comprising" insert -- : --.
Line 60, replace "on" with -- one --.

<u>Column 32,</u>
Line 4, after "a series of rounds" insert -- of offers --.
Line 66, delete entire claim 151, and insert the following claim:
      151. A method for communicating and processing a series of demands to satisfy a claim made by or on behalf of a person involved in a dispute with at least one other person and a series of offers to settle the claim through a computerized system for automated dispute resolution having at least one central processing unit including operating system software for controlling the central processing unit, means for introducing information into the central processing unit corresponding to the identification of the dispute and the persons involved in the dispute and memory means for storing the information corresponding to the identification of the dispute and the persons involved in the dispute, wherein method comprises the steps of:
      (a)    introducing into the central processing unit information corresponding to a series of rounds of demands to satisfy the claim from a party representing a claimant involved in the dispute without disclosure of the demands to other persons involved in the dispute;
      (b)    introducing into the central processing unit information corresponding to a series of rounds of offers to settle the claim from a party representing a person involved in the dispute against whom the claim is made without disclosure of the offers to other persons involved in the dispute;
      (c)    steps (a) and (b) occurring in any order;
      (d)    comparing the information corresponding to the series of demands and the series of offers on a round-by-round basis in accordance with preestablished conditions including (i) that the claim is settled for an amount in accordance with a first preestablished formula if the offer in any round is less than the demand and within a preestablished percentage of the demand in the same round; (ii) that the claim is settled for the demand amount if the offer in any round is the same as or greater than the demand; and (iii) that the claim is not settled if the offer is not within the preestablished percentage of the demand in all rounds unless the difference between the offer and demand is less than a preestablished amount in which case the claim is settled for an amount in accordance with a second preestablished formula;
      (e)    permanently deleting the demand and the offer in each round that does not result it settlement based upon said preestablished conditions upon comparison of the demand and the offer in said round; and

UNITED STATES PATENT AND TRADEMARK OFFICE
CERTIFICATE OF CORRECTION

PATENT NO. : 6,330,551 B1
DATED : December 11, 2001
INVENTOR(S) : James D. Burchetta et al.

It is certified that error appears in the above-identified patent and that said Letters Patent is hereby corrected as shown below:

(f)    communicating to the claimant and the person against whom the claim is made or representatives thereof the results of the comparison.

Column 33,
Line 12, replace "at least on" with -- at least one --.
Line 14, replace "submittec" with -- submitted --.
Line 36, replace "other wit" with -- other with --.

Signed and Sealed this

Twelfth Day of November, 2002

*Attest:*

JAMES E. ROGAN
*Attesting Officer*    *Director of the United States Patent and Trademark Office*